US012757262B2

(12) United States Patent
Sekiguchi

(10) Patent No.: US 12,757,262 B2
(45) Date of Patent: Oct. 6, 2026

(54) METHOD FOR CONTROLLING DISPLAY PROCESSING BASED ON COMMUNICATION PROTOCOL

(71) Applicant: CANON KABUSHIKI KAISHA, Tokyo (JP)

(72) Inventor: Shiho Sekiguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 288 days.

(21) Appl. No.: 18/731,891

(22) Filed: Jun. 3, 2024

(65) Prior Publication Data

US 2024/0414780 A1 Dec. 12, 2024

(30) Foreign Application Priority Data

Jun. 6, 2023 (JP) ................................ 2023-092939

(51) Int. Cl.
*H04W 76/10* (2018.01)
*G06F 3/12* (2006.01)
*H04M 1/72448* (2021.01)

(52) U.S. Cl.
CPC ....... *H04W 76/10* (2018.02); *H04M 1/72448* (2021.01); *G06F 3/1203* (2013.01); *G06F 3/1236* (2013.01)

(58) Field of Classification Search
CPC ............. H04W 76/10; H04M 1/72448; G06F 3/1203; G06F 3/1236
See application file for complete search history.

(56) References Cited

U.S. PATENT DOCUMENTS

2016/0204947 A1* 7/2016 Uchikawa ............ H04L 9/0844 713/175
2018/0227845 A1* 8/2018 Sumiuchi ............. H04W 48/16
2019/0306919 A1* 10/2019 Miyake ................ H04L 63/061

FOREIGN PATENT DOCUMENTS

JP 2016127545 A 7/2016

* cited by examiner

*Primary Examiner* — Sun Jong Kim
(74) *Attorney, Agent, or Firm* — Canon.U.S.A., Inc. IP Division

(57) ABSTRACT

A method is provided in which in a case where a predetermined instruction is received, and Internet Protocol version 4 (IPv4) is set as a protocol used for communication by an information processing apparatus, a first setting process is executed without executing a display process, and in a case where the predetermined instruction is received, and another protocol different from IPv4 is set as a protocol used for communication by the information processing apparatus, the display process is executed.

18 Claims, 11 Drawing Sheets

METHOD FOR CONTROLLING DISPLAY PROCESSING BASED ON COMMUNICATION PROTOCOL

BACKGROUND

Field

The present disclosure relates to an information processing apparatus, a control method, and a storage medium.

Description of the Related Art

A form is known in which an information processing apparatus such as a smartphone transmits information to connect to an access point to a communication apparatus such as a printer, whereby the communication apparatus connects to the access point using the information. Japanese Patent Application Laid-Open No. 2016-127545 discusses a technique in which an information processing apparatus transmits information to a communication apparatus, thereby setting a connection mode for determining a connection form between the information processing apparatus and the communication apparatus in the communication apparatus.

Incidentally, as a form in which an information processing apparatus transmits setting information to connect to a network to a communication apparatus becomes prevalent, an improvement in the convenience of the form is requested.

SUMMARY

The present disclosure is directed to improving the convenience of a form in which an information processing apparatus transmits setting information to connect to a network to a communication apparatus.

According to an aspect of the present disclosure, a method for controlling an information processing apparatus includes receiving a predetermined instruction, executing, in a case where the predetermined instruction is received, a first setting process for transmitting, to a communication apparatus, setting information including information to connect to any of networks formed by any of access points outside the information processing apparatus using a first connection method, executing, in a case where the predetermined instruction is received, a display process for displaying a selection screen that is a screen at least including an area for selecting a second connection method different from the first connection method as a connection method between the communication apparatus and any of the networks, and executing, in a case where the area for selecting the second connection method is selected, a process regarding a second setting process for establishing a connection between the communication apparatus and any of the networks using the second connection method, wherein in a case where the predetermined instruction is received, and Internet Protocol version 4 (IPv4) is set as a protocol used for communication by the information processing apparatus, the first setting process is executed without executing the display process, and wherein in a case where the predetermined instruction is received, and another protocol different from IPv4 is set as a protocol used for communication by the information processing apparatus, the display process is executed.

Further features of the present disclosure will become apparent from the following description of exemplary embodiments with reference to the attached drawings.

DESCRIPTION OF THE EMBODIMENTS

A description is given of an information processing apparatus and a communication apparatus included in a communication system according to a first exemplary embodiment. Although a smartphone is illustrated as an example of the information processing apparatus in the present exemplary embodiment, the present exemplary embodiment is not limited to this. The information processing apparatus is applicable to various apparatuses such as a terminal apparatus, a laptop personal computer (PC), a tablet terminal, a personal digital assistant (PDA), and a digital camera. Although a printer is illustrated as an example of the communication apparatus in the present exemplary embodiment, the present exemplary embodiment is not limited to this. The communication apparatus is applicable to various apparatuses so long as the apparatuses can wirelessly communicate with the information processing apparatus. For example, in the case of a printer, the communication apparatus can be applied to an inkjet printer, a full-color laser beam printer, and a monochrome printer. The communication apparatus is applicable not only to a printer, but also to a copying machine, a facsimile apparatus, a terminal apparatus, a smartphone, a laptop PC, a tablet terminal, a PDA, a digital camera, a music reproduction device, a television, and a smart speaker. Additionally, the communication apparatus is also applicable to a multifunction peripheral having a plurality of functions such as a copy function, a fax function, and a print function.

First, a system configuration for achieving the present exemplary embodiment is described.

Figure 1:
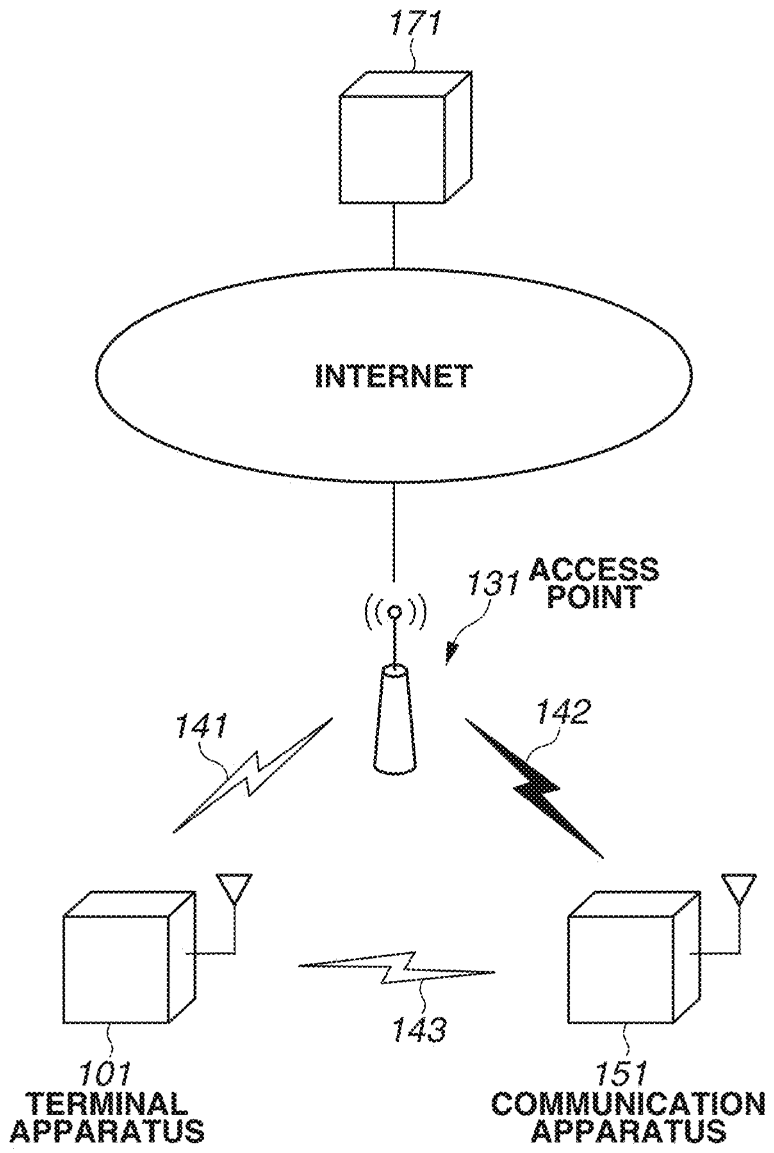
FIG. 1 is a diagram illustrating an example of a communication system according to a first exemplary embodiment of the present disclosure.

FIG. 1 is a diagram illustrating an example of the configuration of the communication system according to the present exemplary embodiment. This system includes a communication apparatus 151, a terminal apparatus 101, an access point (AP) 131, and an external server 171.

The terminal apparatus 101 is the information processing apparatus according to the present exemplary embodiment. The communication apparatus 151 is the communication apparatus according to the present exemplary embodiment. The AP 131 is an external apparatus present outside the terminal apparatus 101 and outside the communication apparatus 151. The external server 171 is a server capable of providing a service via the Internet to an apparatus connected to the AP 131.

A local area network (LAN) formed by the AP 131 includes the AP 131, the communication apparatus 151, and the terminal apparatus 101. On the other hand, a wide area network (WAN) includes the AP 131 and the external server 171.

In the present exemplary embodiment, if an infrastructure connection is established, the terminal apparatus 101 can communicate with the communication apparatus 151 via the AP 131. Further, if a direct connection is established, the terminal apparatus 101 can directly communicate with the communication apparatus 151 not via the AP 131. In the following description, a connection with an AP is equivalent to a connection with a network formed by the AP. An AP may be able to simultaneously form a plurality of networks. In this case, a connection with the AP may be a connection with any of the plurality of networks formed by the AP.

In the present exemplary embodiment, a connection 141 between the terminal apparatus 101 and the AP 131 and a connection 142 between the communication apparatus 151 and the AP 131 are connections using a communication method based on the Institute of Electrical and Electronics Engineers (IEEE) 802.11 series standard. Specifically, the communication method based on the IEEE 802.11 series standard is Wireless Fidelity (Wi-Fi) (registered trademark). A connection 143 between the terminal apparatus 101 and the communication apparatus 151 is a connection using Wi-Fi® or Bluetooth® Low Energy.

The communication method used for each connection is not limited to this form, and for example, may be Bluetooth® Classic, Wi-Fi Aware™, or near-field communication (NFC). The AP 131 and the external server 171 can communicate with each other via the Internet, and in the state where the AP 131 is connected to the Internet, an apparatus (the terminal apparatus 101 or the communication apparatus 151) connected to the AP 131 can also use the Internet. The connection 141 between the terminal apparatus 101 and the AP 131 and the connection 142 between the communication apparatus 151 and the AP 131 may be connections using a wired LAN.

Figure 2:
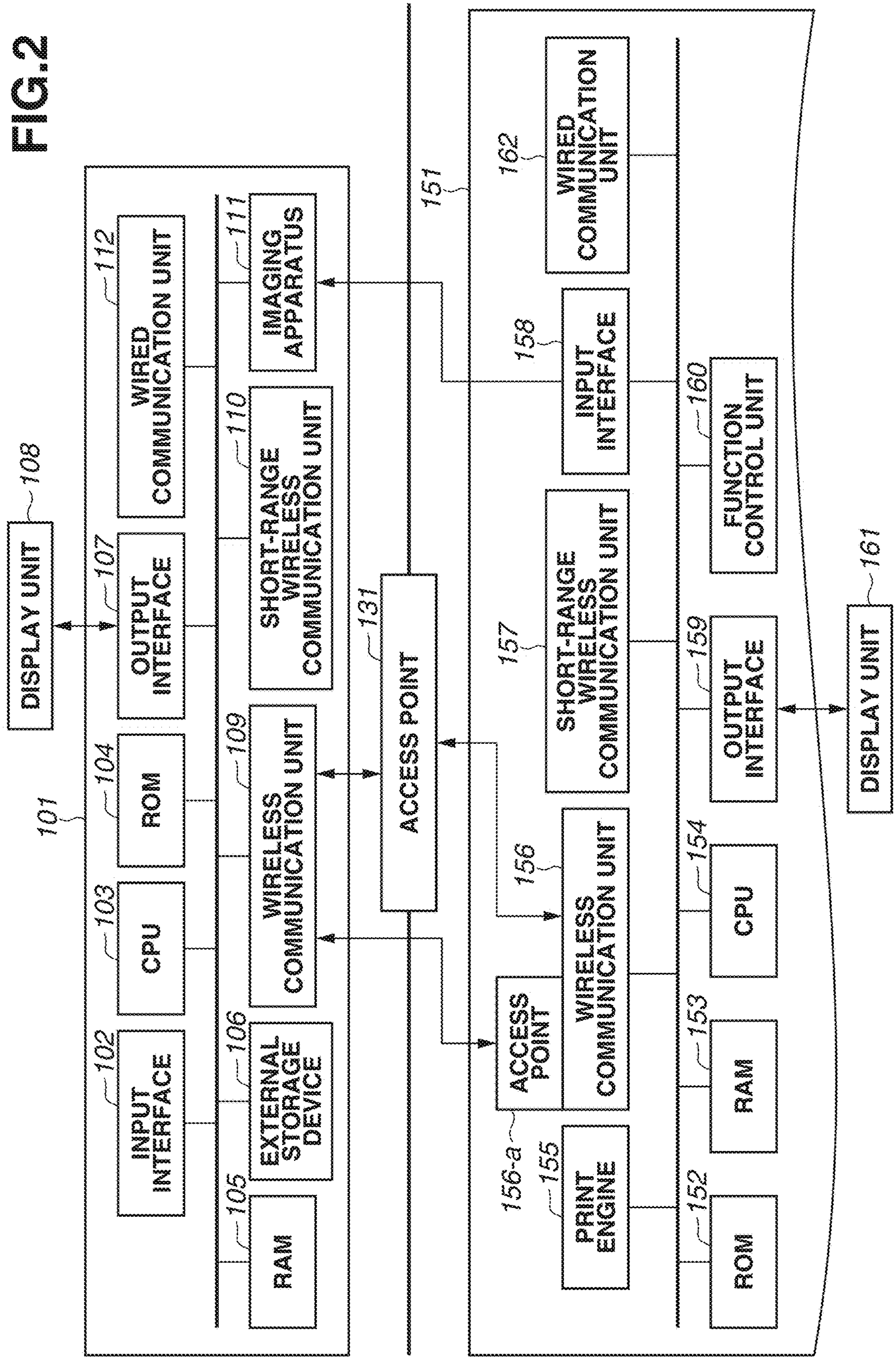
FIG. 2 is an example of a diagram illustrating configurations of a terminal apparatus and a communication apparatus according to the first exemplary embodiment of the present disclosure.

Next, with reference to a block diagram in FIG. 2, a description is given of the configurations of the information processing apparatus according to the present exemplary embodiment and a communication apparatus capable of communicating with the information processing apparatus according to the present exemplary embodiment. Although the present exemplary embodiment is described taking the following configurations as examples, the present exemplary embodiment is applicable to an apparatus capable of communicating with a communication apparatus, and functions are not particularly limited as illustrated in FIG. 2.

The terminal apparatus 101 includes an input interface 102, a central processing unit (CPU) 103, a read-only memory (ROM) 104, a random-access memory (RAM) 105, an external storage device 106, an output interface 107, a display unit 108, a wireless communication unit 109, a short-range wireless communication unit 110, an imaging apparatus 111, and a wired communication unit 112. The CPU 103, the ROM 104, and the RAM 105 form a computer of the terminal apparatus 101. Although a device such as a smartphone is assumed as the terminal apparatus 101, the present exemplary embodiment is not limited to a smartphone.

The input interface 102 is an interface for receiving the input of data or an operation instruction from a user and includes a physical keyboard, a button, and a touch panel. Alternatively, a form may be employed in which the output interface 107 and the input interface 102 are the same component, and the same component outputs a screen and receives an operation from the user.

The CPU 103 is a system control unit and controls the entirety of the terminal apparatus 101.

The ROM 104 stores fixed data such as control programs executed by the CPU 103, a data table, and an operating system (hereinafter referred to as "OS") program. In the present exemplary embodiment, the control programs stored in the ROM 104 control the execution of software such as scheduling, a task switch, and an interrupt process under control of the embedded OS stored in the ROM 104. In the present exemplary embodiment, the ROM 104 stores a setup application program (hereinafter, a "setup app"). For example, the setup app is externally installed on the terminal apparatus 101 by a store application program. The setup app is an app provided by the vendor of the communication apparatus 151. The setup app may have another function other than the function of performing network setup of the communication apparatus 151. Specifically, for example, another function is the function of performing setup other than the network setup of the communication apparatus 151, the function of transmitting a print job for causing the communication apparatus 151 to execute printing, or the function of transmitting a scan job for causing the communication apparatus 151 to execute scanning.

The RAM 105 includes a static random-access memory (SRAM), which requires a backup power supply. In the RAM 105, data is held by a primary battery for data backup (not illustrated). Thus, the RAM 105 can store important data such as a program control variable without volatilizing the data. A memory area that stores setting information regarding the terminal apparatus 101 and management data of the terminal apparatus 101 is also provided in the RAM 105. The RAM 105 is also used as a main memory and a work memory for the CPU 103.

The external storage device 106 includes various programs such as a print information generation program for generating print information that can be interpreted by the communication apparatus 151 and an information transmission/reception control program for transmitting and receiving information to and from the communication apparatus 151 connected to the terminal apparatus 101 via the wireless communication unit 109. The external storage device 106 also saves various pieces of information used by these programs and image data obtained from another information processing apparatus or the Internet.

The output interface 107 is an interface that controls the display unit 108 to display data or give a notification of the state of the terminal apparatus 101.

The display unit 108 includes a light-emitting diode (LED) or a liquid crystal display (LCD). The display unit 108 displays data or gives a notification of the state of the terminal apparatus 101. Alternatively, a software keyboard including keys such as a numerical input key, a mode setting key, a determination key, a cancellation key, and a power key may be provided on the display unit 108, whereby an input from the user may be received through the display unit 108.

The wireless communication unit 109 is a component for wirelessly connecting to an apparatus such as the communication apparatus 151 or the AP 131 and communicating data with the apparatus. For example, the wireless communication unit 109 may directly communicate with the communication apparatus 151 through wireless communication, or may communicate with the communication apparatus 151 via the AP 131 present outside the terminal apparatus 101 or the communication apparatus 151. Although Wi-Fi®, which is a communication method based on the IEEE 802.11 standard, is used as the wireless communication method of the wireless communication unit 109 in the present exemplary embodiment, Bluetooth® Classic may be used. In the present exemplary embodiment, a wireless LAN is a network using Wi-Fi®. Examples of the AP 131 include a device such as a wireless LAN router. In the present exemplary embodiment, a method in which the terminal apparatus 101 and the communication apparatus 151 directly connect to each other not via an external AP is referred to as a "direct connection method". A method in which the terminal apparatus 101 and the communication apparatus 151 connect to each other via an external AP is referred to as an "infrastructure connection method".

The short-range wireless communication unit 110 is a component for communicating data with an apparatus such as the communication apparatus 151 using a short-range wireless communication method and communicates using a communication method different from that of the wireless communication unit 109. The short-range wireless communication unit 110 can connect to a short-range wireless communication unit 157 in the communication apparatus 151. Examples of the communication method of the short-range wireless communication unit 110 include Bluetooth® Low Energy, Bluetooth® Classic, Wi-Fi Aware™, and NFC.

The imaging apparatus 111 is an apparatus that converts an image captured by an imaging element into digital data.

The digital data is temporarily stored in the RAM 105. Then, the digital data is converted into a predetermined image format by a program executed by the CPU 103 and is saved as image data in the external storage device 106.

The wired communication unit 112 is a component for connecting to an apparatus such as the communication apparatus 151 or the AP 131 by wire and communicating data with the apparatus. For example, the wired communication unit 112 communicates using the wired LAN. In the present exemplary embodiment, the wired LAN communicates based on the Ethernet standard. The present exemplary embodiment is not limited to this form, and for example, the wired communication unit 112 may communicate using a Universal Serial Bus (USB) cable.

The communication apparatus 151 includes a ROM 152, a RAM 153, a CPU 154, a print engine 155, a wireless communication unit 156, a short-range wireless communication unit 157, an input interface 158, an output interface 159, a function control unit 160, a display unit 161, and a wired communication unit 162.

The ROM 152, the RAM 153, and the CPU 154 form a computer of the communication apparatus 151.

The wireless communication unit 156 is a component for wirelessly connecting to an apparatus such as the terminal apparatus 101 or the AP 131 and communicating data with the apparatus. Although Wi-Fi is used as the wireless communication method of the wireless communication unit 156 in the present exemplary embodiment, Bluetooth® Classic may be used. The wireless communication unit 156 includes, as an AP inside the communication apparatus 151, an AP 156-*a* for connecting to an apparatus such as the terminal apparatus 101. The AP 156-*a* can connect to the wireless communication unit 109 of the terminal apparatus 101. The wireless communication unit 156 may directly communicate with the terminal apparatus 101 via the AP 156-*a*, or may communicate with the terminal apparatus 101 via the AP 131. The AP 156-*a* may be hardware that functions as an AP, or the wireless communication unit 156 may operate as the AP 156-*a* by software for functioning as an AP. The AP inside the communication apparatus 151 may include a plurality of APs having different SSIDs and passwords. In the present exemplary embodiment, the AP inside the communication apparatus 151 includes at least a connection setting AP.

The RAM 153 includes a dynamic random-access memory (DRAM), which requires a backup power supply. In the RAM 153, data is held by supplying power for data backup (not illustrated) to the RAM 153. Thus, the RAM 153 can store important data such as a program control variable without volatilizing the data. The RAM 153 is also used as a main memory and a work memory for the CPU 154. The RAM 153 saves a reception buffer for temporarily saving print information received from the terminal apparatus 101 and also saves various pieces of information.

The ROM 152 stores fixed data such as control programs executed by the CPU 154, a data table, and an OS program. In the present exemplary embodiment, the control programs stored in the ROM 152 control the execution of software such as scheduling, a task switch, and an interrupt process under control of the embedded OS stored in the ROM 152. A memory area that stores data that needs to be held also in a case where power is not supplied, such as setting information regarding the communication apparatus 151 and management data of the communication apparatus 151, is also provided in the ROM 152.

The CPU 154 is a system control unit and controls the entirety of the communication apparatus 151.

Based on information saved in the RAM 153 or a print job received from the terminal apparatus 101, the print engine 155 forms an image on a recording medium such as paper using a recording agent such as ink and outputs the printing result. At this time, the amount of transmitted data of a print job transmitted from the terminal apparatus 101 is large, and therefore, high-speed communication is required. Thus, the communication apparatus 151 receives the print job via the communication unit 156, which can communicate faster than the short-range wireless communication unit 157.

The short-range wireless communication unit 157 is a component for communicating with an apparatus such as the terminal apparatus 101 using a short-range wireless communication method. Examples of the communication method of the short-range wireless communication unit 157 include Bluetooth® Low Energy, Bluetooth® Classic, and Wi-Fi Aware™.

The input interface 158 is an interface for receiving the input of data or an operation instruction from the user and includes a physical keyboard, a button, and a touch panel. Alternatively, a form may be employed in which the output interface 159 and the input interface 158 are the same component, and the same component outputs a screen and receives an operation from the user. The output interface 159 is an interface that controls the display unit 161 to display data or give an notification of the state of the communication apparatus 151.

The function control unit 160 manages a functional operation regarding whether to cause the function of the communication apparatus 151 to simultaneously operate.

The display unit 161 includes an LED or an LCD. The display unit 161 displays data or gives a notification of the state of the communication apparatus 151. Alternatively, a software keyboard including keys such as a numerical input key, a mode setting key, a determination key, a cancellation key, and a power key may be provided on the display unit 161, whereby an input from the user may be received through the display unit 161.

The wired communication unit 162 is a component for connecting to an apparatus such as the terminal apparatus 101 or the AP 131 by wire and communicating data with the apparatus. For example, the wired communication unit 162 communicates using the wired LAN. The present exemplary embodiment is not limited to this form, and for example, the wired communication unit 162 may communicate using a USB cable.

<Regarding Direct Connection Method>

A "direct connection" refers to a form in which apparatuses wirelessly connect to each other directly (i.e., in a peer-to-peer manner) not via an external apparatus such as the AP 131. A direct connection is also referred to as a "peer-to-peer connection (P2P connection)". The communication apparatus 151 can operate in a mode for communicating through a direct connection (a direct connection mode) as one of connection modes. In Wi-Fi® communication, there is a plurality of modes such as a software AP mode and a Wi-Fi Direct® (WFD) mode as modes for communicating through a direct connection.

A mode for executing a direct connection using WFD is referred to as a "WFD mode". WFD is a standard formulated by the Wi-Fi Alliance® and is a standard included in the communication standards of the IEEE 802.11 series. In the WFD mode, after a device as a communication partner is found by a search using a device search command, the roles of a P2P group owner (GO) and a P2P client are determined. Then, the remaining wireless connection process is performed. The group owner is equivalent to a Wi-Fi® master station (master apparatus), and the client is equivalent to a Wi-Fi® slave station (slave apparatus). For example, this role determination corresponds to GO negotiation in P2P. In the WFD mode in the state before the role determination is made, the communication apparatus 151 is neither a master station nor a slave station. Specifically, first, one device issues a device search command to a device with which to communicate, thereby searching for a device to which to connect in the WFD mode. If the other device as a communication partner is found by the search, both devices confirm information regarding services and functions that can be supplied by the other devices. This device supply information confirmation is an option and is not essential. For example, this device supply information confirmation phase corresponds to P2P provision discovery. Next, the devices confirm this device supply information with each other and determine which of the devices is to be a P2P client and which of the devices is to be a P2P group owner as the roles of the device supply information. Next, if the client and the group owner are determined, both devices exchange parameters to communicate using WFD with each other. Based on the exchanged parameters, the P2P client and the P2P group owner perform the remaining wireless connection process and an Internet Protocol (IP) connection process. In the WFD mode, the communication apparatus 151 may not execute the GO negotiation, and the communication apparatus 151 may always operate as a GO. That is, the communication apparatus 151 may operate in the WFD mode as autonomous GO mode. For example, the state where the communication apparatus 151 is operating in the WFD mode is the state where a connection using WFD is not established, but the communication apparatus 151 is operating as a GO, or the state where a connection using WFD is established, and the communication apparatus 151 is operating as a GO.

In the software AP mode, between devices that communicate with each other (e.g., the information processing apparatus 101 and the communication apparatus 151), one device (e.g., the information processing apparatus 101) is a client that serves to request various services. Then, the other device achieves the function of an AP in Wi-Fi based on the settings of software. The software AP is equivalent to a Wi-Fi master station, and the client is equivalent to a Wi-Fi slave station. In the software AP mode, a client searches for a device as a software AP using a device search command. If a software AP is found by the search, the client and the software AP perform the remaining wireless connection process (the establishment of a wireless connection) and then perform an IP connection process (the assignment of IP addresses). As commands and parameters transmitted and received in a case where the client and the software AP achieve a wireless connection, those defined by the Wi-Fi standard may be used, and the commands and the parameters are not described here.

In the present exemplary embodiment, if the communication apparatus 151 establishes and maintains a direct connection, the communication apparatus 151 operates as a master station in a network to which the communication apparatus 151 belongs. The master station is an apparatus that constructs a wireless network and provides a parameter used to connect to the wireless network to a slave station. For example, the parameter used to connect to the wireless network is a parameter regarding a channel used by the master station. The slave station receives the parameter, thereby connecting to the wireless network constructed by the master station, using the channel used by the master station. In the direct connection mode, the communication apparatus 151 operates as the master station, and therefore, the communication apparatus 151 can determine which frequency band is to be used and which channel is to be used for communication in the direct connection mode. In the present exemplary embodiment, the communication apparatus 151 can use a channel corresponding to the 2.4 GHz frequency band and a channel corresponding to the 5 GHz frequency band for communication in the direct connection mode. Then, based on a setting on a non-illustrated setting screen, the user can optionally set which of the frequency bands is to be used (i.e., to which of the frequency bands a channel to be used corresponds). That is, if 2.4 GHz is selected on the setting screen, the communication apparatus 151 uses a channel corresponding to the 2.4 GHz frequency band for communication in the direct connection mode. If, on the other hand, 5 GHz is selected on the setting screen, the communication apparatus 151 uses a channel corresponding to the 5 GHz frequency band for communication in the direct connection mode. In the present exemplary embodiment, however, even if 5 GHz is selected on the setting screen, the communication apparatus 151 does not use a channel corresponding to a Dynamic Frequency Selection (DFS) band in the 5 GHz frequency band for communication in the direct connection mode. In other words, the communication apparatus 151 uses only a channel corresponding to a frequency band other than the DFS band in the 5 GHz frequency band for communication in the direct connection mode. In the state where a channel corresponding to the DFS band is used, if a radar wave in a frequency band corresponding to the channel is detected, the currently used channel needs to be changed. Such a frequency band in which a channel can change due to the detection of a radar wave is referred to as a "DFS band". For example, in a case where a wireless chip compatible with a DFS function is used, a channel corresponding to the DFS band in the 5 GHz frequency band may be able to be used for communication in the direct connection mode. A channel determined as a channel to be used in the direct connection mode is used for communication through a direct connection. Further, the channel is also used by the master station to transmit a beacon signal or transmit a response to a received command. That is, the channel is used not only for a communication process in the direct connection mode in the state where a direct connection is established, but also for a communication process in the direct connection mode in the state where a direct connection is not established.

Although in the above description, a form has been described in which the user is allowed to set whether to use a channel corresponding to the 2.4 GHz frequency band or to use a channel corresponding to the 5 GHz frequency band in the direct connection mode, the present exemplary embodiment is not limited to this form. A form may be employed in which the specifying of a channel number is received from the user, whereby the user can specifically set the channel number of a channel to be used in the direct connection mode. Alternatively, a form may be employed in which a channel to be used in the direct connection mode is not optionally set by the user, but is set in advance in the communication apparatus 151.

Although in the above description, a form has been described in which the communication apparatus 151 can use the 2.4 GHz frequency band and the 5 GHz frequency band, the present exemplary embodiment is not limited to this form. The communication apparatus 151 may be able to use another frequency band. In the present exemplary embodiment, in a process in which the 2.4 GHz frequency band or the 5 GHz frequency band is used, another frequency band may be used. For example, in the IEEE 802.11ad standard, the 60 GHz frequency band can be used, and therefore, 60 GHz may be used as another frequency band.

<Regarding Infrastructure Connection Method>

An infrastructure connection is a connection form in which devices that communicate with each other (e.g., the information processing apparatus 101 and the communication apparatus 151) connect to an AP (e.g., the AP 131) that performs overall control of a network of the devices, and the devices communicate with each other via the AP. The communication apparatus 151 can also operate in a mode for communicating through an infrastructure connection (an infrastructure connection mode) as one of the connection modes.

In an infrastructure connection, each device searches for an AP using a device search command. If an AP is found by the search, the device and the AP perform the remaining wireless connection process (the establishment of a wireless connection) and then perform an IP connection process (the assignment of IP addresses). As commands and parameters transmitted and received in a case where the device and the AP achieve a wireless connection, those defined by the Wi-Fi® standard may be used, and the commands and the parameters are not described here.

In the present exemplary embodiment, if the communication apparatus 151 operates through an infrastructure connection, the AP 131 operates as a master station, and the communication apparatus 151 operates as a slave apparatus. That is, in the present exemplary embodiment, an "infrastructure connection" refers to a connection between the communication apparatus 151 operating as a slave apparatus and an apparatus operating as a master apparatus. If the communication apparatus 151 establishes an infrastructure connection with the AP 131, and the information processing apparatus 101 also establishes an infrastructure connection with the AP 131, the communication apparatus 151 and the information processing apparatus 101 can communicate with each other via the AP 131. A channel to be used for communication in the infrastructure connection is determined by the AP 131, and therefore, the communication apparatus 151 communicates through the infrastructure connection using the channel determined by the AP 131. In the present exemplary embodiment, the communication apparatus 151 can use a channel corresponding to the 2.4 GHz frequency band and a channel corresponding to the 5 GHz frequency band for communication through the infrastructure connection. The communication apparatus 151 can also use a channel corresponding to the DFS band in the 5 GHz frequency band for communication in the infrastructure connection. To communicate with the communication apparatus 151 via the AP 131, the information processing apparatus 101 needs to recognize that the communication apparatus 151 belongs to a network which is formed by the AP 131 and to which the information processing apparatus 101 belongs.

<Regarding Simultaneous Operation>

The communication apparatus 151 according to the present exemplary embodiment can execute an operation in the infrastructure mode and an operation in the direct connection mode simultaneously (in parallel). Thus, the communication apparatus 151 can maintain a connection for communicating in the infrastructure mode and a connection for communicating in the direct connection mode simultaneously (in parallel). In other words, the communication apparatus 151 can establish a Wi-Fi® connection in which the communication apparatus 151 is a slave apparatus and a Wi-Fi® connection in which the communication apparatus 151 is a master apparatus in parallel. Hereinafter, an operation in which the communication apparatus 151 establishes an infrastructure connection and a direct connection simultaneously (in parallel) and operates so that the communication apparatus 151 can communicate through the infrastructure connection and the direct connection simultaneously (in parallel) will be referred to as a "simultaneous operation". In other words, the simultaneous operation is an operation in which the communication apparatus 151 executes an operation as a master apparatus (a group owner or an AP) and an operation as a slave apparatus in parallel.

Communication in the infrastructure mode and communication in the direct connection mode are performed using particular frequency bands (particular channels). Thus, in each of the communication in the infrastructure mode and the communication in the direct connection mode, a channel to be used for communication and a connection between apparatuses needs to be determined first before the communication is started.

In a form in which communication is performed by simultaneously assigning a plurality of channels to a single wireless integrated circuit (IC) chip, the configurations of apparatuses that communicate with each other and the processing executed by the apparatuses are complex. Thus, for example, in a case where the communication apparatus 151 performs the simultaneous operation, it is desirable that a common channel should be used in communication in each mode. That is, even in a case where the communication apparatus 151 is performing the simultaneous operation, it is desirable that the communication apparatus 151 should use only a single channel. Thus, in the present exemplary embodiment, the wireless communication unit 156 includes only a single wireless IC chip for achieving communication using a predetermined channel, and the communication apparatus 151 does not communicate using simultaneously a plurality of channels.

<Regarding Connection Setting Mode>

The communication apparatus 151 can operate in a connection setting mode. For example, a trigger for the communication apparatus 151 to start operating in the connection setting mode may be the state where the user presses a button for the connection setting mode or the state where the communication apparatus 151 starts (is powered on) for the first time after the arrival of shipment. The button for the connection setting mode may be a hardware button included in the communication apparatus 151, or may be a software button displayed on the display unit 161 by the communication apparatus 151.

If the communication apparatus 151 starts operating in the connection setting mode, the communication apparatus 151 enables both Wi-Fi communication and Bluetooth® Low Energy communication. Specifically, as the process of enabling Wi-Fi communication, the communication apparatus 151 enables an AP dedicated to the connection setting mode and inside the communication apparatus 151 (a connection setting AP). Consequently, the communication apparatus 151 enters the state where the communication apparatus 151 can establish a direct connection using Wi-Fi with the terminal apparatus 101. Connection information (a Service Set Identifier (SSID) and a password) to connect to the connection setting AP is held in advance in the setup app installed on the terminal apparatus 101, and the terminal apparatus 101 recognizes the connection information to connect to the connection setting AP in advance. Alternatively, a form may be employed in which an encryption method is not set for the connection setting AP, and a password is not required to connect to the AP. Thus, unlike connection information regarding an AP that is enabled in the direct connection mode, the connection information to connect to the connection setting AP cannot be optionally changed by the user. In the connection setting mode, the communication apparatus 151 may connect to the terminal apparatus 101 using not normal Wi-Fi but WFD. That is, the communication apparatus 151 may operate as a group owner and receive a setting command from the terminal apparatus 101 through communication using WFD.

<Regarding Wireless Profile>

A "wireless profile" is information stored in and managed by the OS of the terminal apparatus 101 and is information including connection information regarding an AP to which the terminal apparatus 101 has connected in the past. For example, the wireless profile is used for a reconnection function that is a function in which, in a case where a connection between the terminal apparatus 101 and an AP is disconnected, the OS automatically re-establishes the connection.

Figure 9A:
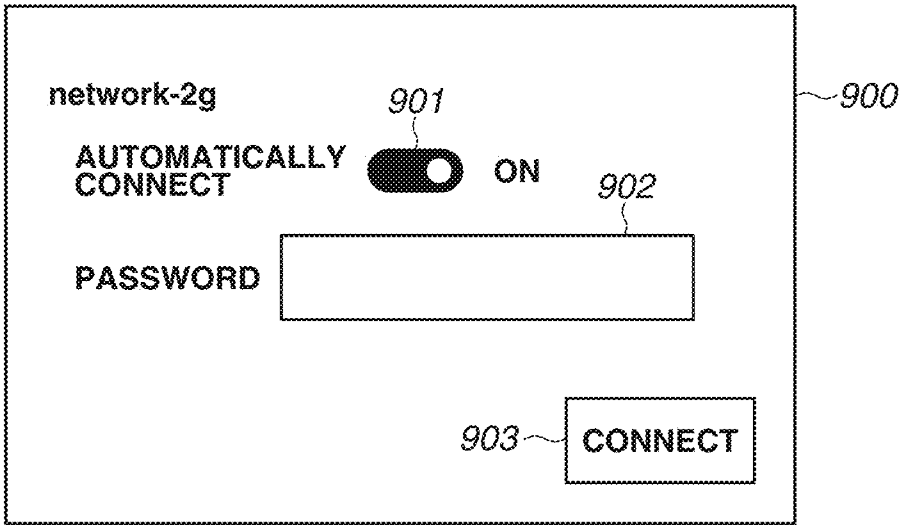
FIGS. 9A and 9B are examples of connection screens displayed in the first exemplary embodiment of the present disclosure.

FIG. 9A illustrates a connection screen 900 that is a screen displayed by the OS and is a screen for the terminal apparatus 101 to connect to an AP. The connection screen 900 is a screen for connecting to the AP 131 having an SSID displayed on the screen 900. The connection screen 900 includes an area 901 for setting whether to enable the reconnection function in a connection to the AP 131, an area 902 for receiving the input of a password to connect to the AP 131, and an area 903 for attempting to establish a connection between the AP 131 and the terminal apparatus 101 using the input password. In a case where the reconnection function is set to enabled using the area 901, and if a connection between the terminal apparatus 101 and the AP 131 is disconnected, the OS automatically re-establishes the connection. On the other hand, in a case where the reconnection function is set to disabled using the area 901, and even if a connection between the terminal apparatus 101 and the AP 131 is disconnected, the OS does not automatically re-establish the connection. If the establishment of a connection between the AP 131 and the terminal apparatus 101 is successful by pressing the area 903, the OS saves connection information (an SSID and a password) regarding the AP 131 as a wireless profile. However, in the state where the reconnection function is set to disabled, even if the establishment of a connection between the AP 131 and the terminal apparatus 101 is successful, a particular type of the OS or a particular version of the OS does not save the connection information regarding the AP 131 as a wireless profile.

Figure 9B:
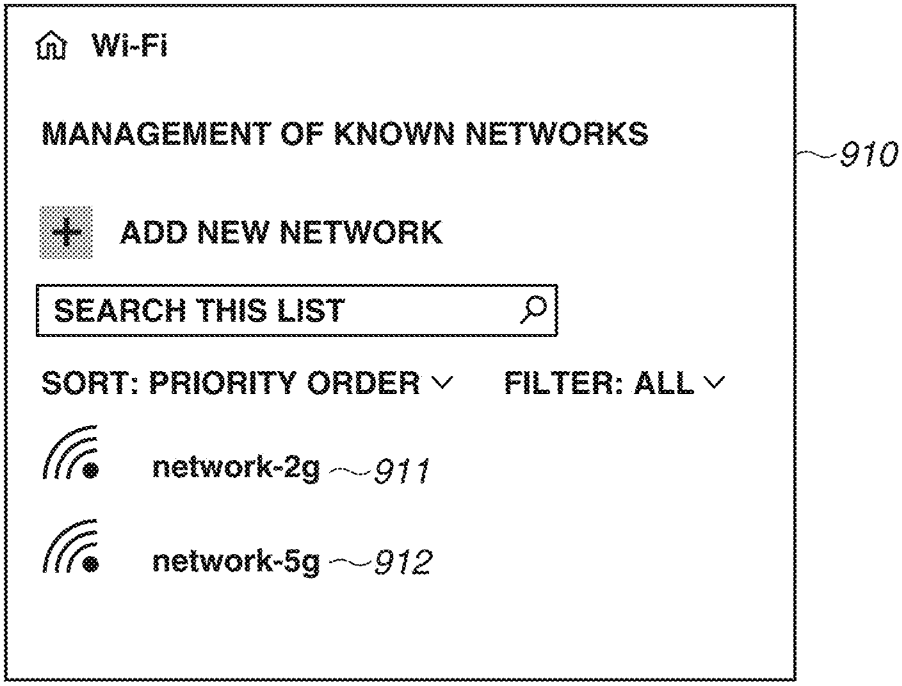

FIG. 9B illustrates a wireless profile screen 910 that is a screen displayed by the OS and is a screen for indicating stored wireless profiles. The wireless profile screen 910 is an example of a screen in a case where the OS stores two wireless profiles. On the wireless profile screen 910, a wireless profile having high priority is displayed at a higher rank. The wireless profile having high priority is a wireless profile that is used more preferentially in the state where a connection between the terminal apparatus 101 and an AP is not established. An area 911 is an area where the first wireless profile having high priority is indicated by an SSID. An area 912 is an area where the second wireless profile having low priority is indicated by an SSID. A predetermined operation is executed on the area 911 or 912, whereby it is possible to delete the wireless profile corresponding to the area on which the predetermined operation is executed from the terminal apparatus 101.

<Regarding Processing Executed by Terminal Apparatus 101 and Communication Apparatus 151>

In the present exemplary embodiment, the setup app can execute network setup of the communication apparatus 151 through a wireless connection between the terminal apparatus 101 and the communication apparatus 151 operating in the connection setting mode (hereinafter, "first setup"). In other words, the first setup is a setup method for connecting the communication apparatus 151 and an AP by the terminal apparatus 101 transmitting setting information to the communication apparatus 151 through wireless communication using the setup app. The setting information includes a password for connecting to the AP. At this time, if a wireless profile corresponding to a predetermined AP as a connection partner of the communication apparatus 151 is saved in advance in the terminal apparatus 101 before the setup app receives a predetermined operation (a predetermined instruction) for network setup from the user, the setup app can execute the first setup without receiving the input of a password from the user.

In the present exemplary embodiment, the communication apparatus 151 can also connect to an AP using a method other than the first setup. Second setup and third setup that are methods other than the first setup are network setup performed without the terminal apparatus 101 transmitting setting information to the communication apparatus 151 through wireless communication using the setup app. Specifically, for example, the second setup is network setup using Wi-Fi Protected Setup™ (WPS) by a push button method. Alternatively, the second setup may be network setup using WPS by a Personal Identification Number (PIN) code method. Yet alternatively, the second setup may be network setup using a standard other than WPS, such as AirStation One-Touch Secure System™ (AOSS) or Rakuraku Musen Start®. Yet alternatively, the second setup may be network setup performed by establishing a connection between an AP selected by the user performing an operation on the communication apparatus 151 among APs found by a search by the communication apparatus 151 and the communication apparatus 151 using the wireless LAN. The third setup that is a method other than the first setup is network setup performed by establishing a connection between an AP and the communication apparatus 151 using the wired LAN. Alternatively, the third setup may be network setup performed by establishing a connection between the terminal apparatus 101 and the communication apparatus 151 using USB. The second setup and the third setup are setup methods that can be executed without the user inputting a password to connect to an AP to the setup app. If the wireless profile corresponding to the predetermined AP is not saved in advance in the terminal apparatus 101 before the setup app receives the predetermined instruction from the user, it is desirable that the setup app should execute a predetermined process for setup other than the first setup. This is because many users feel that the second setup and the third setup are more convenient than the first setup in a case where an operation to input a password is involved. Specifically, for example, the predetermined process is the process of displaying a selection screen or the process of displaying a guide screen.

However, even if the wireless profile corresponding to the predetermined AP is not saved in advance in the terminal apparatus 101 before the setup app receives the predetermined instruction from the user, but if the predetermined AP does not require a password, the setup app can execute the first setup without receiving the input of the password from the user. Nonetheless, in a case where the wireless profile corresponding to the predetermined AP is not saved in advance in the terminal apparatus 101 before the setup app receives the predetermined instruction from the user, and the predetermined AP does not require a password, and if the predetermined process is executed, the usability decreases.

Accordingly, in the present exemplary embodiment, if the wireless profile corresponding to the predetermined AP is not saved in advance in the terminal apparatus 101 before the setup app receives the predetermined instruction from the user, and the predetermined AP does not require a password, the first setup is executed without executing the predetermined process. On the other hand, if the wireless profile corresponding to the predetermined AP is not saved in the terminal apparatus 101, and the predetermined AP requires a password, the predetermined process is executed.

As described above, in the present exemplary embodiment, in the first setup, communication through a wireless connection between the terminal apparatus 101 and the communication apparatus 151 operating in the connection setting mode is executed. If, however, Internet Protocol version 6 (IPv6) is set in the terminal apparatus 101 as a protocol used for communication by the terminal apparatus 101, there is a case where the communication cannot be executed. This is because there is a case where the communication apparatus 151 operating in the connection setting mode cannot execute communication using IPv6. Thus, in the present exemplary embodiment, if Internet Protocol version 4 (IPv4) is set in the terminal apparatus 101 as a protocol used for communication by the terminal apparatus 101, the first setup is executed without executing the predetermined process. If, on the other hand, IPv6 is set in the terminal apparatus 101 as a protocol used for communication by the terminal apparatus 101, the predetermined process is executed. The case where IPv4 is set in the terminal apparatus 101 as a protocol used for communication by the terminal apparatus 101 is a case where communication by the wireless communication unit 109 using IPv4 is set to enabled in the terminal apparatus 101. Similarly, the case where IPv6 is set in the terminal apparatus 101 as a protocol used for communication by the terminal apparatus 101 is a case where communication by the wireless communication unit 109 using IPv6 is set to enabled in the terminal apparatus 101.

With this form, it is possible to improve the convenience of setup of the communication apparatus 151.

Figure 3:
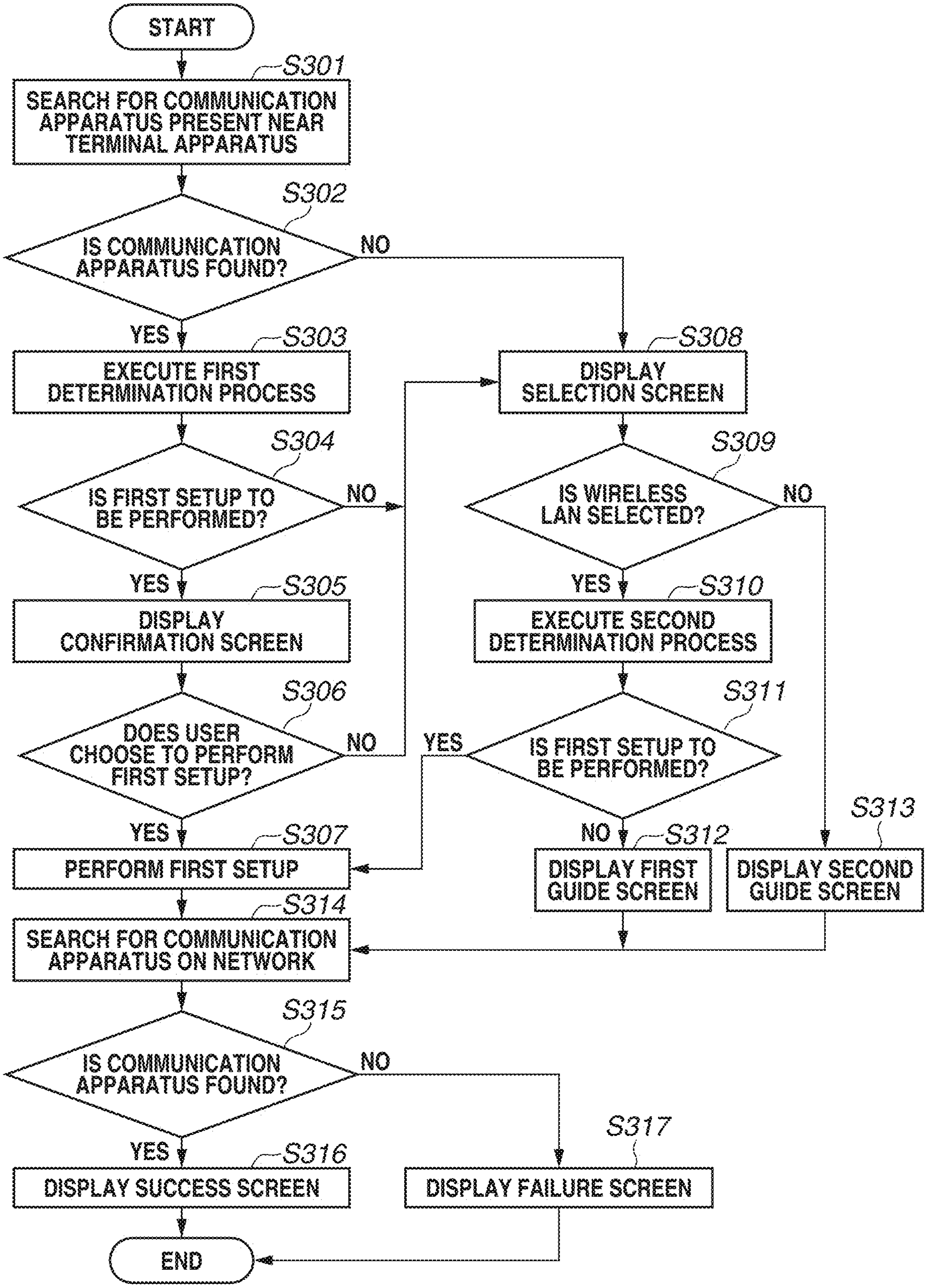
FIG. 3 is a flowchart illustrating network setup of the communication apparatus executed by the terminal apparatus according to the first exemplary embodiment of the present disclosure.

FIG. 3 is a flowchart illustrating network setup of the communication apparatus 151 executed by the terminal apparatus 101. This flowchart is achieved by the CPU 103 loading a program stored in the ROM 104 into the RAM 105 and executing the program. In the present exemplary embodiment, the terminal apparatus 101 executes processing using the setup app. This flowchart is started based on the state where the user gives the predetermined instruction on a screen displayed by the setup app.

In step S301, the CPU 103 searches for a communication apparatus 151 operating in the connection setting mode.

Specifically, the CPU 103 searches for a beacon that is emitted from a communication apparatus 151 operating in the connection setting mode and includes an SSID corresponding to the connection setting mode.

In step S302, the CPU 103 determines whether a communication apparatus 151 operating in the connection setting mode is found by the search in step S301. Specifically, the CPU 103 detects beacons emitted from apparatuses near the terminal apparatus 101 and determines whether the detected beacons include a beacon that is emitted from a communication apparatus 151 operating in the connection setting mode and includes an SSID corresponding to the connection setting mode. The SSID corresponding to the connection setting mode is the same SSID as the connection information to connect to the connection setting AP that is held in advance in the setup app. Thus, the CPU 103 determines whether the beacons emitted from the apparatuses near the terminal apparatus 101 include a beacon including the same SSID as the connection information to connect to the connection setting AP that is held in advance in the setup app.

If the determination of the CPU 103 is YES (YES in step S302), the processing proceeds to step S303. If the determination of the CPU 103 is NO (NO in step S302), the processing proceeds to step S308. If the determination of the CPU 103 is YES, the CPU 103 identifies the found communication apparatus 151 as an apparatus as a network setup target (hereinafter, a "target apparatus"). If a plurality of found communication apparatuses 151 is present, the first found communication apparatus 151 may be identified as the target apparatus, or a communication apparatus 151 selected by the user among the plurality of found communication apparatuses 151 may be identified as the target apparatus. In the following description, the processing for the network setup is performed regarding the communication apparatus 151 identified as the target apparatus.

In step S303, the CPU 103 executes a first determination process for determining whether to perform the first setup without executing the predetermined process. The details of the first determination process will be described below with reference to FIG. 4.

In step S304, the CPU 103 determines whether it is determined in the first determination process that the first setup is to be performed without executing the predetermined process. If the determination of the CPU 103 is YES (YES in step S304), the processing proceeds to step S305. If the determination of the CPU 103 is NO (NO in step S304), the processing proceeds to step S308. If the determination of the CPU 103 is YES, the CPU 103 executes the first setup without executing a process regarding setup other than the first setup, such as the display of a selection screen or the display of a guide screen.

If, on the other hand, the determination of the CPU 103 is NO, the CPU 103 executes a process regarding setup other than the first setup, such as the display of a selection screen or the display of a guide screen.

Figure 6:
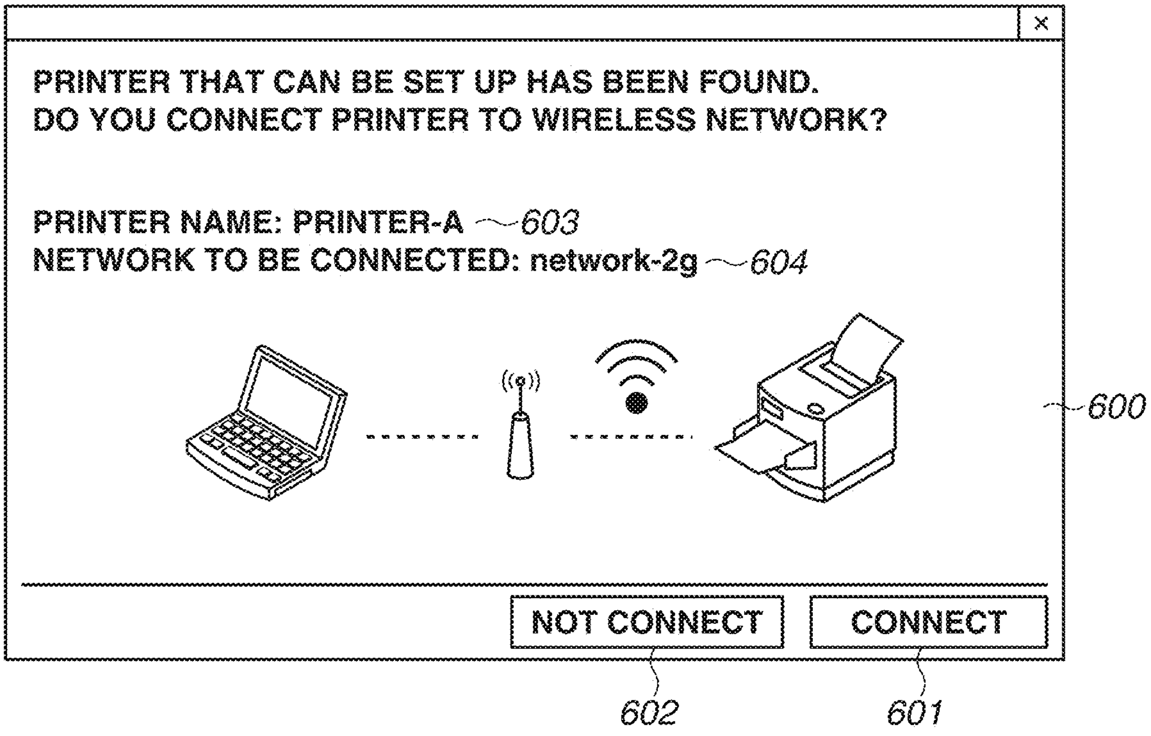
FIG. 6 is an example of a confirmation screen displayed in the first exemplary embodiment of the present disclosure.

In step S305, the CPU 103 displays on the display unit 108 a confirmation screen for confirming whether to perform the first setup. In this case, for example, a confirmation screen 600 illustrated in FIG. 6 is displayed. For example, the confirmation screen 600 includes a button 601 for choosing to perform the first setup, and a button 602 for choosing not to perform the first setup.

For example, the confirmation screen 600 also includes an area 603 indicating the name of the communication apparatus 151, and an area 604 indicating the SSID of a network to which the terminal apparatus 101 is currently connected. The name of the communication apparatus 151 is included in the beacon acquired from the communication apparatus 151 by the search in step S301. The SSID of the network to which the terminal apparatus 101 is currently connected is acquired in the first determination process.

In step S306, the CPU 103 determines whether the user chooses to perform the first setup on the confirmation screen 600. In this determination, specifically, it is determined whether the button 601 is selected or the button 602 is selected. If the determination of the CPU 103 is YES (YES in step S306), the processing proceeds to step S307. If the determination of the CPU 103 is NO (NO in step S306), the processing proceeds to step S308.

Alternatively, the processes of steps S305 and S306 may be omitted. That is, if the determination is YES in step S304, the processes of steps S305 and S306 may not be executed, and the processing may proceed to step S307.

In step S307, the CPU 103 performs the first setup. The details of this process will be described below with reference to FIG. 7. Then, the processing proceeds to step S314.

Figure 10A:
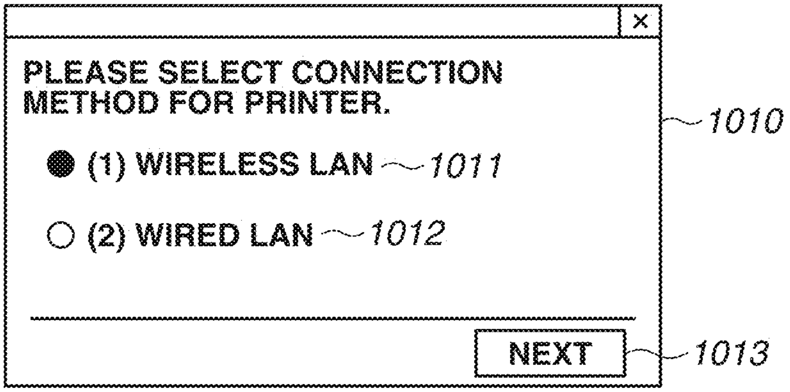
FIGS. 10A to 10E are examples of screens displayed in the first exemplary embodiment of the present disclosure.

As described above, if the determination is NO in step S302, or if the determination is NO in step S304, or if the determination is NO in step S306, step S308 is executed. In step S308, the CPU 103 receives the selection of a connection method between the terminal apparatus 101 and the communication apparatus 151 from the user. In this case, for example, a selection screen 1010 illustrated in FIG. 10A is displayed on the display unit 108. For example, the selection screen 1010 includes an area 1011 for selecting a connection method using the wireless LAN, an area 1012 for selecting a connection method using the wired LAN, and a button 1013 for displaying a next screen. Network setup for establishing a connection between the terminal apparatus 101 and the communication apparatus 151 by the connection method using the wireless LAN includes the first setup and the second setup. Thus, in the present exemplary embodiment, setup that can be executed in a case where the area 1011 is selected includes the first setup and the second setup. In other words, the area 1011 is an option corresponding to at least the second setup. Network setup for establishing a connection between the terminal apparatus 101 and the communication apparatus 151 by the connection method using the wired LAN includes the third setup. Thus, in the present exemplary embodiment, setup that can be executed in a case where the area 1012 is selected includes the third setup. In other words, the area 1012 is an option corresponding to at least the third setup. For example, the selection screen 1010 may also include an area for selecting a connection method using USB or an area for selecting a connection method using Bluetooth®. If the area for selecting the connection method using USB is selected, setup for a connection using USB is executed as the third setup. If the area for selecting the connection method using Bluetooth® is selected, setup for a connection using Bluetooth® is executed as the third setup.

After either of the connection methods is selected by the user selecting the area 1011 or 1012, and if the button 1013 is pressed by the user, the processing proceeds to step S309.

In step S309, the CPU 103 determines whether the connection method using the wireless LAN is selected on the selection screen 1010. If the determination of the CPU 103 is YES (YES in step S309), the processing proceeds to step S310. If the determination of the CPU 103 is NO (NO in step S309), the processing proceeds to step S313.

In step S310, the CPU 103 executes a second determination process for determining whether to perform the first setup. The details of the second determination process will be described below with reference to FIG. 5.

In step S311, the CPU 103 determines whether it is determined in the second determination process that the first setup is to be performed. If the determination of the CPU 103 is YES (YES in step S311), the processing proceeds to step S307. If the determination of the CPU 103 is NO (NO in step S311), the processing proceeds to step S312.

Figure 10B:
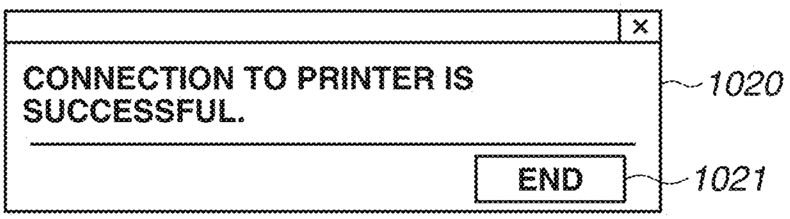
Figure 10C:
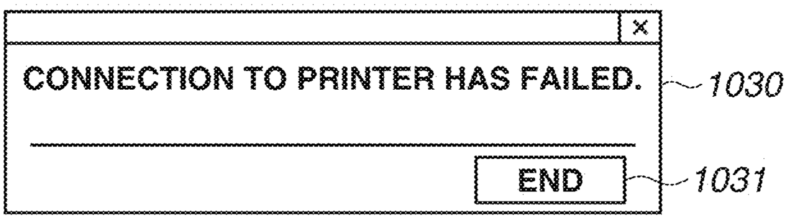
Figure 10D:
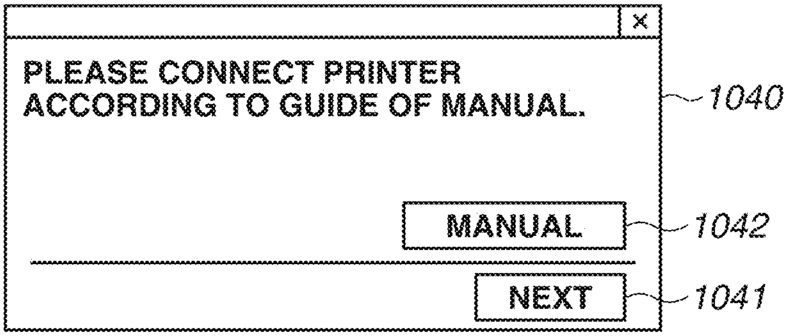

In step S312, the CPU 103 displays a first guide screen for the second setup on the display unit 108. In this case, for example, a guide screen 1040 illustrated in FIG. 10D is displayed as the first guide screen on the display unit 108. For example, the guide screen 1040 includes an area 1042 for displaying a manual illustrating an operation method for the user to perform the second setup on a web browser of the terminal apparatus 101, and a button 1041 for displaying a next screen.

If the area 1042 is selected, the CPU 103 starts the web browser of the terminal apparatus 101 and displays the manual on the web browser. The present exemplary embodiment is not limited to this form, and the manual may be displayed not on the web browser but directly on a setting app. If the button 1041 is pressed by the user, the processing proceeds to step S314.

Figure 10E:
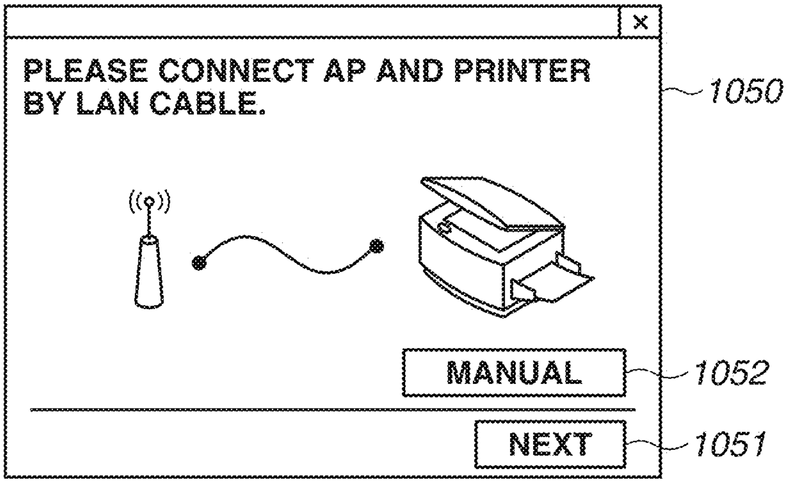

In step S313, the CPU 103 displays a second guide screen for the third setup on the display unit 108. In this case, for example, a guide screen 1050 illustrated in FIG. 10E is displayed as the second guide screen on the display unit 108. For example, the guide screen 1050 includes an area 1052 for displaying a manual illustrating an operation method for the user to perform the third setup on the web browser of the terminal apparatus 101, and a button 1051 for displaying a next screen. Alternatively, the guide screen 1050 may include the method itself for the user to perform the third setup. Specifically, for example, the guide screen 1050 may include an area for promoting the user to connect an AP and the communication apparatus 151 using the wired LAN (a LAN cable). If the third setup is setup for a connection using USB, the guide screen 1050 may be a screen for promoting the user to connect the terminal apparatus 101 and the communication apparatus 151 by a USB cable. If the third setup is setup for a connection using Bluetooth®, the guide screen 1050 may be a screen for promoting the user to connect the terminal apparatus 101 and the communication apparatus 151 using Bluetooth®.

In step S314, the CPU 103 searches for a communication apparatus 151 on a network which is formed by an AP and to which the terminal apparatus 101 belongs. If a communication apparatus 151 and the terminal apparatus 101 are connected to the same AP by executing any of the first setup, the second setup, and the third setup, the communication apparatus 151 is found by this search.

In step S315, the CPU 103 determines whether a communication apparatus 151 is found by the search in step S314. If the determination of the CPU 103 is YES (YES in step S315), the processing proceeds to step S316. If the determination of the CPU 103 is NO (NO in step S315), the processing proceeds to step S317. In a case where this process is executed after the first setup, the CPU 103 identifies whether a communication apparatus 151 that is the transmission destination of setting information by the first setup is included in one or more apparatuses found by the search in step S314. Then, if it is identified that the communication apparatus 151 is included, this determination is YES. That is, if no apparatus is found by the search in step S314, or a communication apparatus 151 that is the transmission destination of setting information by the first setup is not included in one or more apparatuses found by the search in step S314, this determination is NO. In a case where this process is executed after the second setup or the third setup, the CPU 103 displays one or more apparatuses found by the search in step S314 and receives a selection from the user. Then, if a selection is received from the user, this determination is YES. That is, if no apparatus is found by the search in step S314, and a selection is not received from the user, this determination is NO.

In step S316, the CPU 103 displays on the display unit 108 a success screen that is a screen corresponding to the state where a communication apparatus 151 is found by the search in step S314. In this case, for example, a success screen 1020 illustrated in FIG. 10B is displayed on the display unit 108. For example, the success screen 1020 includes a message indicating that a communication apparatus 151 is found, or a message indicating that a connection to a communication apparatus 151 is successful. If an end button 1021 included in the success screen 1020 is pressed, the processing of this flowchart ends.

If a communication apparatus 151 is found by the search in step S314, the CPU 103 may acquire ability information regarding the ability of the communication apparatus 151 from the communication apparatus 151. Then, the ability information may be used for a print setting process for setting a print job to be transmitted to the communication apparatus 151 or a scan setting process for setting a scan job to be transmitted to the communication apparatus 151. For example, the ability information is information indicating on which sheet printing can be executed or information indicating on which sheet scanning can be executed.

In step S317, the CPU 103 displays on the display unit 108 a failure screen that is a screen corresponding to the state where a communication apparatus 151 is not found by the search in step S314. In this case, for example, a failure screen 1030 illustrated in FIG. 10C is displayed on the display unit 108. For example, the failure screen 1030 includes a message indicating that a communication apparatus 151 is not found, or a message indicating that a connection to a communication apparatus 151 has failed. If an end button 1031 included in the failure screen 1030 is pressed, the processing of this flowchart ends.

Figure 4:
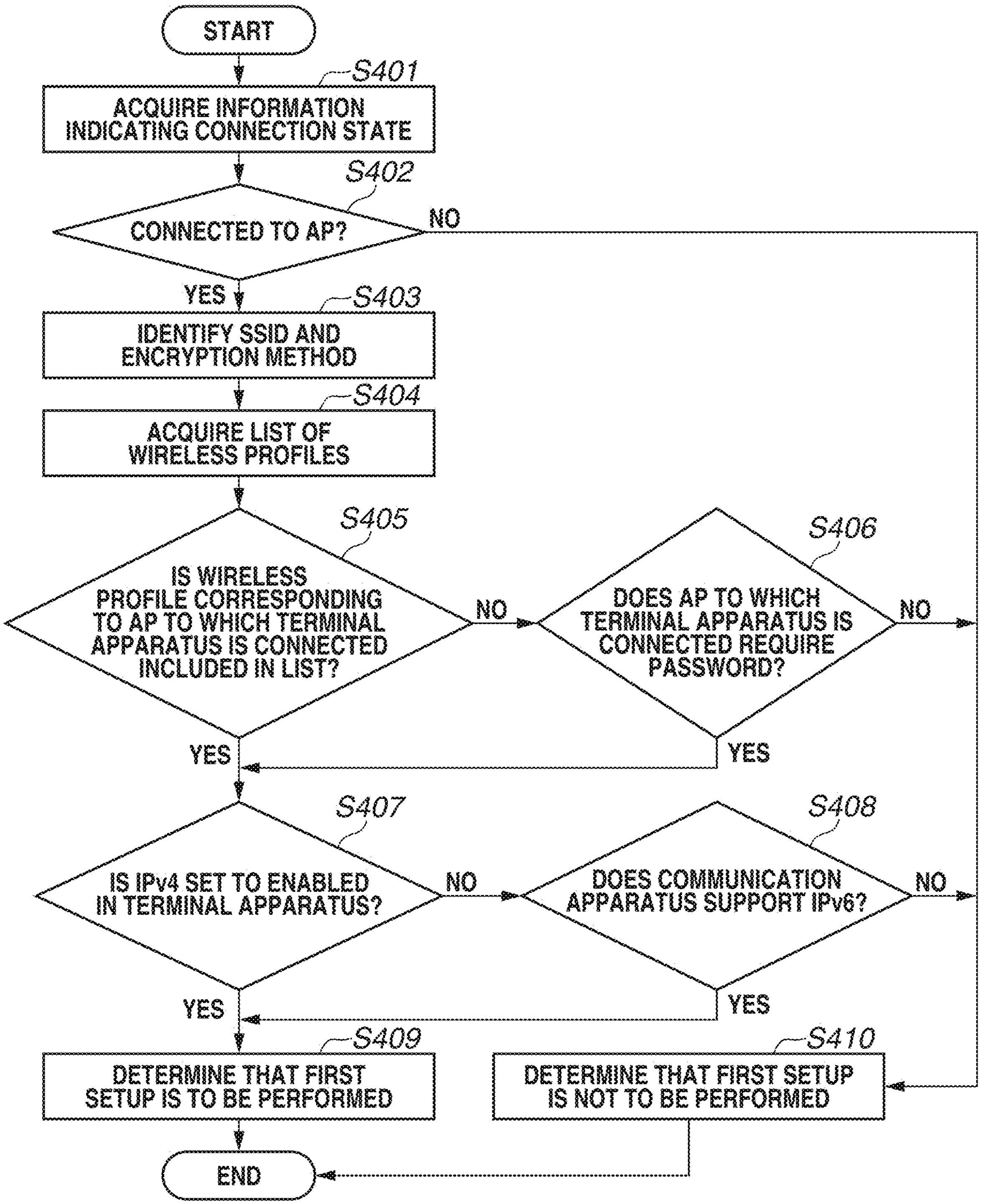
FIG. 4 is a flowchart illustrating a first determination process executed by the terminal apparatus according to the first exemplary embodiment of the present disclosure.

FIG. 4 is a flowchart illustrating the first determination process executed by the terminal apparatus 101. This flowchart is achieved by the CPU 103 loading a program stored in the ROM 104 into the RAM 105 and executing the program. In the present exemplary embodiment, the terminal apparatus 101 executes processing using the setup app. This flowchart corresponds to the process of step S303.

In step S401, the CPU 103 acquires information indicating the connection state of the wireless communication unit 109 from the OS of the terminal apparatus 101. In other words, the connection state of the wireless communication unit 109 is the state of the connection of the terminal apparatus 101 using Wi-Fi®.

In step S402, based on the information acquired in step S401, the CPU 103 determines whether the terminal apparatus 101 is connected to any AP. If the determination of the CPU 103 is YES (YES in step S402), the processing proceeds to step S403. If the determination of the CPU 103 is NO (NO in step S402), the processing proceeds to step S410.

In step S403, the CPU 103 identifies the SSID of the AP to which the terminal apparatus 101 is connected and an encryption method used by the AP to which the terminal apparatus 101 is connected.

In step S404, the CPU 103 acquires a list of wireless profiles held in the terminal apparatus 101 from the OS of the terminal apparatus 101. The wireless profiles held in the terminal apparatus 101 are information regarding APs to which the terminal apparatus 101 has connected in the past. Specifically, the wireless profiles held in the terminal apparatus 101 are the SSIDs of the APs to which the terminal apparatus 101 has connected in the past and passwords to connect to the APs to which the terminal apparatus 101 has connected in the past.

In step S405, the CPU 103 determines whether a wireless profile corresponding to the AP to which the terminal apparatus 101 is connected is included in the list acquired in step S404. If the determination of the CPU 103 is YES (YES in step S405), the processing proceeds to step S407. If the determination of the CPU 103 is NO (NO in step S405), the processing proceeds to step S406. The case where the determination is YES corresponds to a case where the wireless profile corresponding to the AP to which the terminal apparatus 101 is connected is saved in advance in the terminal apparatus 101 before the setup app receives the predetermined instruction from the user. As described above, depending on the type or the version of the OS of the terminal apparatus 101, in the state where the reconnection function is set to disabled, even if the terminal apparatus 101 newly connects to an AP, the OS does not save a wireless profile regarding the AP. Thus, the case where the wireless profile corresponding to the AP to which the terminal apparatus 101 is connected is not included in the list acquired in step S404 is a case where the wireless profile is not saved because the reconnection function is set to disabled.

In step S406, based on the encryption method identified in step S403, the CPU 103 determines whether a password is required to connect to the AP to which the terminal apparatus 101 is connected. The case where a password is required to connect to the AP to which the terminal apparatus 101 is connected is a case where an encryption method such as Wired Equivalent Privacy (WEP), Wi-Fi Protected Access (WPA), WPA2, or WPA3 is identified in step S403 as the encryption method set for the AP to which the terminal apparatus 101 is connected. On the other hand, the case where a password is not required to connect to the AP to which the terminal apparatus 101 is connected is a case where an encryption method is not set for the AP to which the terminal apparatus 101 is connected, and there is no encryption method identified in step S403, or a case where a network formed by the AP to which the terminal apparatus 101 is connected is an open network. If the determination of the CPU 103 is YES (YES in step S406), the processing proceeds to step S407. If the determination of the CPU 103 is NO (NO in step S406), the processing proceeds to step S410.

In step S407, based on the information acquired in step S401, the CPU 103 determines whether communication by the wireless communication unit 109 using IPv4 is set to enabled in the terminal apparatus 101. If the determination of the CPU 103 is YES (YES in step S407), the processing proceeds to step S409. If the determination of the CPU 103 is NO (NO in step S407), the processing proceeds to step S408.

In the present exemplary embodiment, in the communication in step S401, communication by the wireless communication unit 109 is performed between the terminal apparatus 101 and the communication apparatus 151 before step S407. Thus, if communication by the wireless communication unit 109 using IPv4 is not set to enabled in the terminal apparatus 101, it is assumed that communication by the wireless communication unit 109 using IPv6 is set to enabled in the terminal apparatus 101. Thus, in the present exemplary embodiment, after step S407, the process of determining whether communication by the wireless communication unit 109 using IPv6 is set to enabled in the terminal apparatus 101 is not executed. However, assuming a case where the setting is changed after the communication by the wireless communication unit 109 between the terminal apparatus 101 and the communication apparatus 151 performed before step S407, the process of determining whether communication by the wireless communication unit 109 using IPv6 is set to enabled in the terminal apparatus 101 based on the information acquired in step S401 may be executed after the determination is NO in step S407. Then, If the determination of the CPU 103 is YES, the processing may proceed to step S408. If the determination of the CPU 103 is NO, the processing may proceed to step S410.

In step S408, the CPU 103 determines whether the communication apparatus 151 identified as the target apparatus in step S302 supports P2P communication using IPv6. The state where the communication apparatus 151 supports P2P communication using IPv6 corresponds to the state where the communication apparatus 151 has the function of P2P communication using IPv6. In this determination, specifically, the CPU 103 determines whether information corresponding to the state where the communication apparatus 151 supports P2P communication using IPv6 is included in the beacon detected in step S302 and transmitted from the communication apparatus 151. The determination method in this determination is not limited to the above form, and for example, may be a determination method for determining whether the model of the communication apparatus 151 identified based on the beacon transmitted from the communication apparatus 151 is a model that supports P2P communication using IPV6. If the determination of the CPU 103 is YES (YES in step S408), the processing proceeds to step S409. If the determination of the CPU 103 is NO (NO in step S408), the processing proceeds to step S410.

In the present exemplary embodiment, the determination in step S408 is made assuming that a communication apparatus 151 capable of using IPv6 also for P2P communication in the connection setting mode is present as an apparatus with which the setup app is compatible. Thus, for example, if a communication apparatus 151 capable of using IPv6 also for P2P communication in the connection setting mode is not present as an apparatus with which the setup app is compatible, the determination in step S408 may be omitted. In this case, if the determination of the CPU 103 in step S407 is YES (YES in step S407), the processing may proceed to step S409. If the determination of the CPU 103 in step S407 is NO (NO in step S407), the processing may proceed to step S410. In other words, the case where a communication apparatus 151 capable of using IPv6 also for P2P communication in the connection setting mode is not present as an apparatus with which the setup app is compatible is a case where only a communication apparatus 151 using only IPv4 for P2P communication in the connection setting mode is present as an apparatus with which the setup app is compatible.

A communication apparatus 151 using only IPv4 for P2P communication in the connection setting mode may also be able to use IPv6 for P2P communication in a mode different from the connection setting mode.

In step S409, the CPU 103 determines that the first setup is to be performed without executing the predetermined process. The result of this determination is referred to in step S304. After step S409, the processing of this flowchart ends.

In step S410, the CPU 103 determines that the first setup is not to be performed without executing the predetermined process. The result of this determination is referred to in step S304. After step S410, the processing of this flowchart ends.

Figure 5:
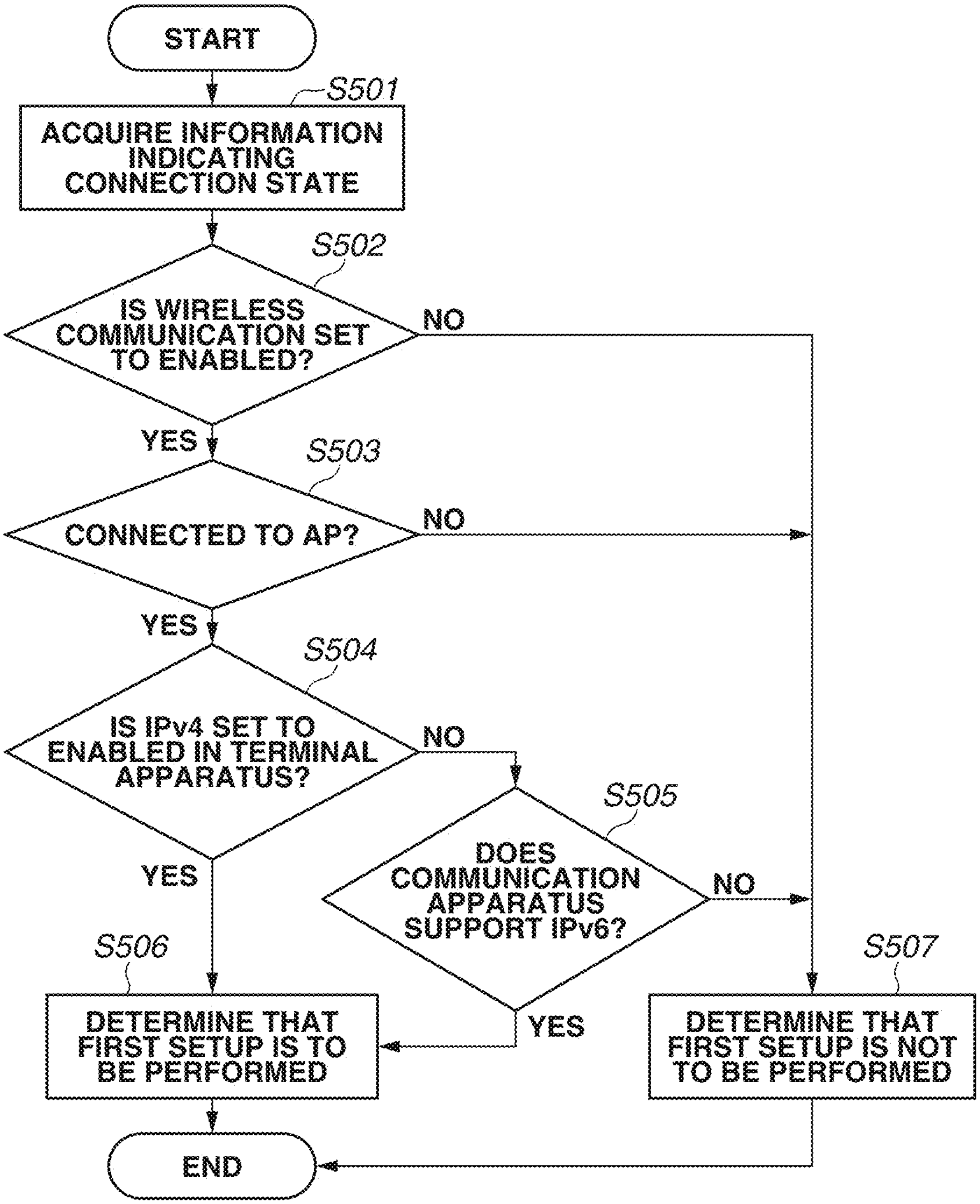
FIG. 5 is a flowchart illustrating a second determination process executed by the terminal apparatus according to the first exemplary embodiment of the present disclosure.

FIG. 5 is a flowchart illustrating the second determination process executed by the terminal apparatus 101. This flowchart is achieved by the CPU 103 loading a program stored in the ROM 104 into the RAM 105 and executing the program. In the present exemplary embodiment, the terminal apparatus 101 executes processing using the setup app. This flowchart corresponds to the process of step S310.

In step S501, the CPU 103 acquires information indicating the connection state of the wireless communication unit 109 and information indicating the connection state of the wired communication unit 112 from the OS of the terminal apparatus 101. In other words, the connection state of the wired communication unit 112 is the state of the connection of the terminal apparatus 101 using the wired LAN.

In step S502, based on the information indicating the connection state of the wireless communication unit 109 acquired in step S501, the CPU 103 determines whether communication by the wireless communication unit 109 is set to enabled. If the determination of the CPU 103 is YES (YES in step S502), the processing proceeds to step S503. If the determination of the CPU 103 is NO (NO in step S502), the processing proceeds to step S507.

In step S503, based on the information acquired in step S501, the CPU 103 determines whether the terminal apparatus 101 is connected to any AP by the wireless communication unit 109 or the wired communication unit 112. If the determination of the CPU 103 is YES (YES in step S503), the processing proceeds to step S504. If the determination of the CPU 103 is NO (NO in step S503), the processing proceeds to step S507.

In step S504, based on the information indicating the connection state of the wireless communication unit 109 acquired in step S501, the CPU 103 determines whether communication by the wireless communication unit 109 using IPv4 is set to enabled in the terminal apparatus 101. If the determination of the CPU 103 is YES (YES in step S504), the processing proceeds to step S506. If the determination of the CPU 103 is NO (NO in step S504), the processing proceeds to step S505.

In step S505, the CPU 103 determines whether the communication apparatus 151 identified as the target apparatus in step S302 supports P2P communication using IPv6. This determination is similar to that in step S408. If the determination of the CPU 103 is YES (YES in step S505), the processing proceeds to step S506. If the determination of the CPU 103 is NO (NO in step S505), the processing proceeds to step S507.

In step S506, the CPU 103 determines that the first setup is to be performed. The result of this determination is referred to in step S311. After step S506, the processing of this flowchart ends.

In step S507, the CPU 103 determines that the first setup is not to be performed. The result of this determination is referred to in step S311. After step S507, the processing of this flowchart ends.

Figure 7:
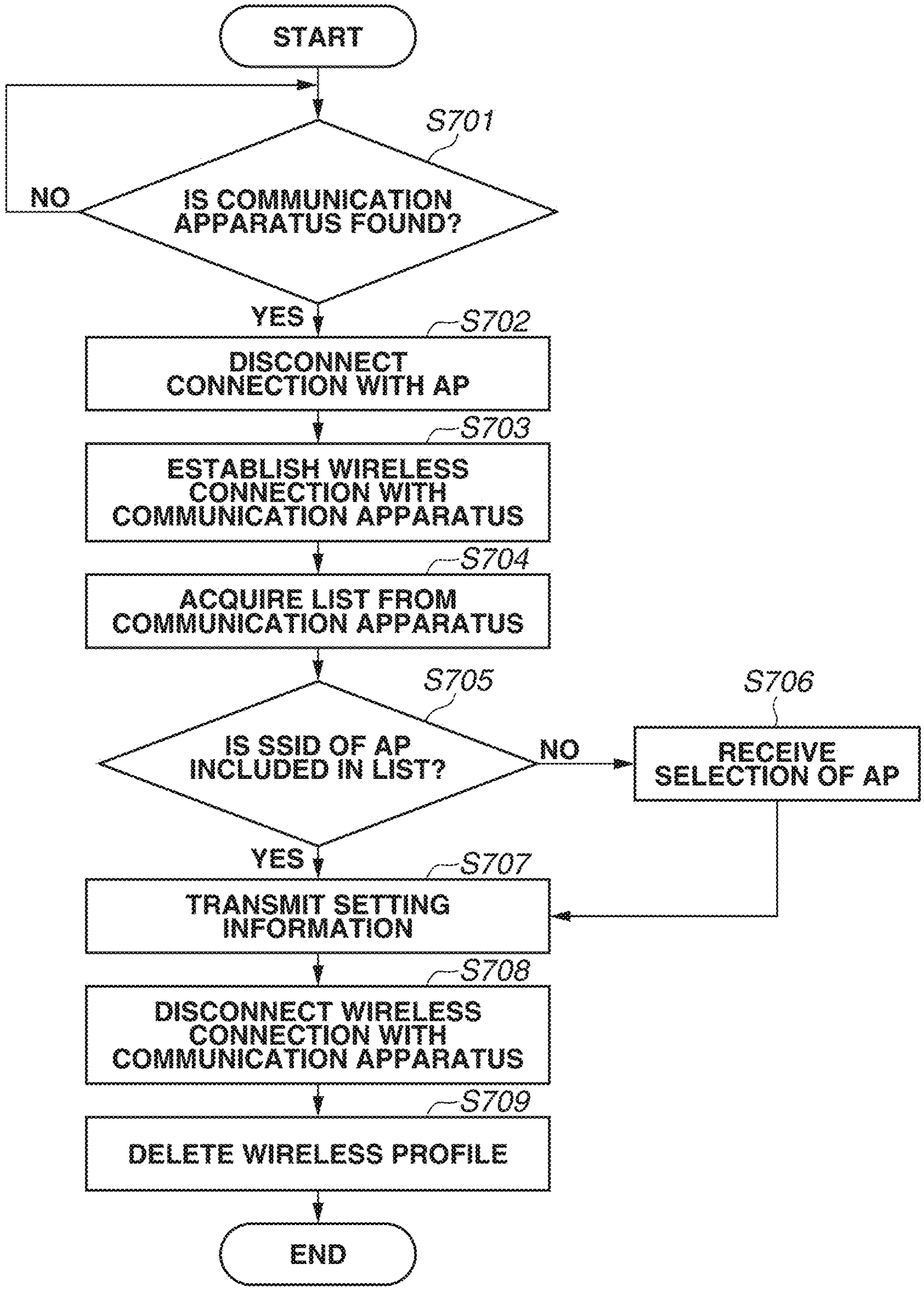
FIG. 7 is a flowchart illustrating first setup executed by the terminal apparatus according to the first exemplary embodiment of the present disclosure.

FIG. 7 is a flowchart illustrating the first setup executed by the terminal apparatus 101. This flowchart is achieved by the CPU 103 loading a program stored in the ROM 104 into the RAM 105 and executing the program. In the present exemplary embodiment, the terminal apparatus 101 executes processing using the setup app. This flowchart corresponds to the process of step S307.

In step S701, the CPU 103 searches for a communication apparatus 151 operating in the connection setting mode.

Then, the CPU 103 determines whether a communication apparatus 151 operating in the connection setting mode is found. If the determination of the CPU 103 is YES (YES in step S701), the processing proceeds to step S702. If the determination of the CPU 103 is NO (NO in step S701), the processing returns to step S701. In step S701, the CPU 103 repeats the search. If a communication apparatus 151 operating in the connection setting mode is already found in step S302, this process may be omitted.

In step S702, if there is an AP to which the terminal apparatus 101 is connected by the wireless communication unit 109, the CPU 103 disconnects the connection between the terminal apparatus 101 and the AP. At this time, the CPU 103 stores connection information to connect to the AP in a memory such as the ROM 104.

The AP can be said to be an AP to which the terminal apparatus 101 is connected when the predetermined operation for network setup of the communication apparatus 151 is performed. The AP can also be said to be an AP to which the terminal apparatus 101 has been connected until immediately before a wireless connection between the communication apparatus 151 and the terminal apparatus 101 is established in step S703.

In step S703, the CPU 103 establishes a wireless connection between the communication apparatus 151 operating in the connection setting mode and the terminal apparatus 101.

In step S704, the CPU 103 transmits an information acquisition request to the communication apparatus 151, thereby acquiring a list of APs found by a search by the communication apparatus 151 from the communication apparatus 151. In other words, the list of APs found by the search by the communication apparatus 151 is a list of networks found by the search by the communication apparatus 151. The list includes the SSIDs of the APs found by the search by the communication apparatus 151.

In step S705, the CPU 103 determines whether the SSID of the AP corresponding to the connection information stored in step S702 is included in the list acquired in step S704. If the determination of the CPU 103 is YES (YES in step S705), the processing proceeds to step S707. If the determination of the CPU 103 is NO (NO in step S705), the processing proceeds to step S706. If the determination of the CPU 103 is YES, the CPU 103 identifies the AP corresponding to the connection information stored in step S702 as an AP to be connected to the communication apparatus 151.

Figure 11:
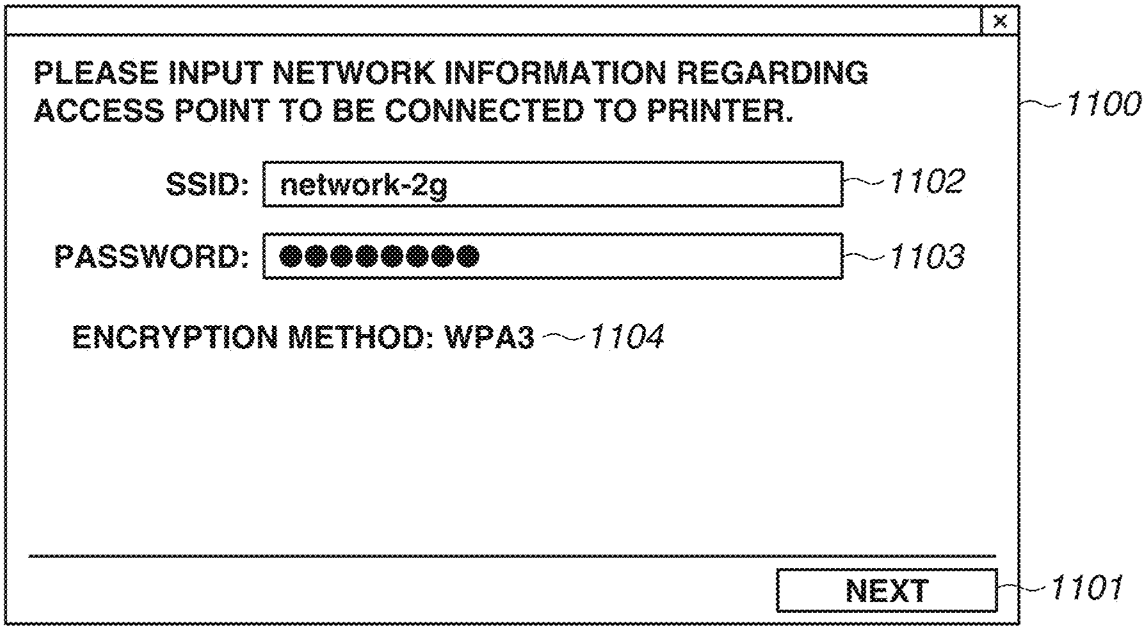
FIG. 11 is an example of an input screen displayed in the first exemplary embodiment of the present disclosure.

In step S706, the CPU 103 displays the list acquired in step S704 and receives the selection of any of the APs in the list from the user. In other words, the selection of the AP is the selection of the network formed by the AP. The CPU 103 identifies the AP selected by the user as an AP to be connected to the communication apparatus 151. For example, in this process, a screen as illustrated in FIG. 11 is displayed as an input screen 1100 for receiving the selection of an AP from the user. The input screen 1100 includes an area 1102 for receiving the selection of an AP from the user, an area 1103 for receiving the input of a password to connect to the AP selected by the user, an area 1104 indicating an encryption method used by the AP selected by the user, and an area 1101 for identifying the AP corresponding to the input information as an AP to be connected to the communication apparatus 151. If the area 1102 is selected, the list acquired in step S704 is displayed in a drop-down format. If the OS of the terminal apparatus 101 already holds as a wireless profile a password used to connect to the AP selected by the user, the CPU 103 may not need to receive the input of the password from the user. If an encryption method is not set for the AP selected by the user, and a password is not required to connect to the AP, the CPU 103 may not need to receive the input of the password from the user. Alternatively, instead of receiving the selection of an AP from the list acquired in step S704, the CPU 103 may receive the input of any SSID and password from the user, thereby identifying an AP corresponding to the input information as an AP to be connected to the communication apparatus 151. If the area 1101 is selected, the CPU 103 saves the information selected or input on the input screen 1100 to transmit the information as setting information. At this time, the CPU 103 may perform the process of verifying whether the information selected or input on the input screen 1100 is correct. Specifically, the CPU 103 may verify whether the input password matches the format of the encryption method used by the selected AP.

In step S707, the CPU 103 transmits to the communication apparatus 151 the setting information regarding the AP identified as the AP to be connected to the communication apparatus 151. The setting information includes connection information (an SSID and a password) to connect to the AP identified as the AP to be connected to the communication apparatus 151.

In step S708, the CPU 103 disconnects the wireless connection between the communication apparatus 151 operating in the connection setting mode and the terminal apparatus 101. Then, the CPU 103 establishes a connection between the AP corresponding to the connection information stored in step S702 and the terminal apparatus 101 using the connection information stored in step S702. At this time, the CPU 103 may establish a connection between the AP corresponding to the connection information transmitted in step S707 and the terminal apparatus 101 using the connection information transmitted in step S707.

In step S709, if connection information to connect to the communication apparatus 151 operating in the connection setting mode is saved as a wireless profile by the OS, the CPU 103 deletes the wireless profile. Consequently, the CPU 103 prevents the wireless connection between the communication apparatus 151 operating in the connection setting mode and the terminal apparatus 101 from being established again at a timing unintended by the user. Then, the processing of this flowchart ends.

Figure 8:
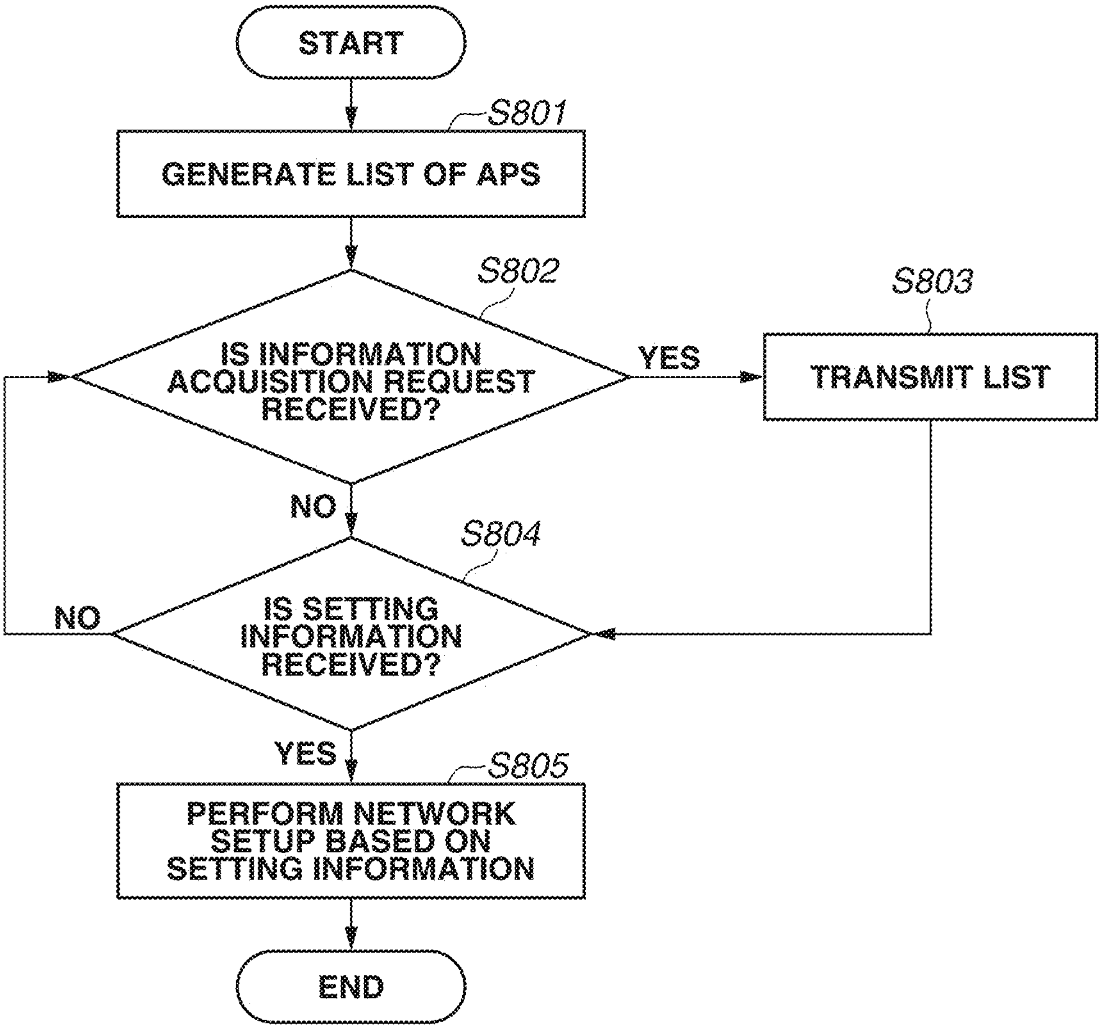
FIG. 8 is a flowchart illustrating the first setup executed by the communication apparatus according to the first exemplary embodiment of the present disclosure.

FIG. 8 is a flowchart illustrating the first setup executed by the communication apparatus 151. This flowchart is achieved by the CPU 154 loading a program stored in the ROM 152 into the RAM 153 and executing the program. This flowchart is started based on the state where the communication apparatus 151 receives from the user an operation for causing the communication apparatus 151 to operate in the connection setting mode.

In step S801, the CPU 154 searches for APs present near the communication apparatus 151 and generates a list of found APs.

In step S802, the CPU 154 determines whether an information acquisition request is received from the terminal apparatus 101. If the determination of the CPU 154 is YES (YES in step S802), the processing proceeds to step S803. If the determination of the CPU 154 is NO (NO in step S802), the processing proceeds to step S804.

Alternatively, step S801 may not be executed before step S802, and step S801 may be executed after the determination is YES in step S802.

In step S803, the CPU 154 transmits the list generated in step S801 to the terminal apparatus 101.

In step S804, the CPU 154 determines whether setting information is received from the terminal apparatus 101. If the determination of the CPU 154 is YES (YES in step S804), the processing proceeds to step S805. If the determination of the CPU 154 is NO (NO in step S804), the processing returns to step S802.

In step S805, the CPU 154 performs network setup based on the received setting information. Specifically, the CPU 154 establishes a connection between an AP corresponding to connection information included in the received setting information and the communication apparatus 151 using the connection information included in the received setting information. Then, the processing of this flowchart ends.

With the above form, it is possible to improve the convenience of setup of the communication apparatus 151 for the user.

OTHER EXEMPLARY EMBODIMENTS

In the above description, if the area 1011 is selected, whether to execute the first setup or display the guide screen for the second setup is controlled according to the result of the second determination process. The present exemplary embodiment, however, is not limited to this form. If the area 1011 is selected, the guide screen for the second setup may be displayed without executing the second determination process. That is, if the determination is YES in step S309, step S312 may be executed without executing steps S310 and S311.

In the above description, both the determination in step S406 and the determination in step S407 are included in the first determination process. Alternatively, a form may be employed in which only either one of these determinations is included in the first determination process. That is, for example, in the form in which only the determination in step S406 is included, if the determination is YES in step S405, or if the determination is YES in step S406, step S409 may be executed without executing step S407 or S408.

In the form in which only the determination in step S407 is included, if the determination is NO in step S405, step S410 may be executed without executing step S406.

In the above description, a form has been described in which the process executed in a case where it is determined in the first determination process that the first setup is not to be performed is the process of displaying the selection screen 1010 including the option corresponding to the second setup and the option corresponding to the third setup. The present exemplary embodiment, however, is not limited to this form. If it is determined in the first determination process that the first setup is not to be performed, the guide screen 1040 for the second setup may be displayed without displaying the selection screen 1010. Alternatively, if it is determined in the first determination process that the first setup is not to be performed, the guide screen 1050 for the third setup may be displayed without displaying the selection screen 1010.

In the above description, in the first setup, the terminal apparatus 101 transmits the setting information to the communication apparatus 151 using the wireless communication unit 109. The present exemplary embodiment, however, is not limited to this form. The terminal apparatus 101 may transmit the setting information to the communication apparatus 151 using the short-range wireless communication unit 110. That is, the setting information may be transmitted through communication using Bluetooth® Low Energy or Bluetooth® between the terminal apparatus 101 and the communication apparatus 151. In this form, in step S702, the connection between the terminal apparatus 101 and the AP using the wireless LAN does not need to be disconnected. That is, the terminal apparatus 101 may transmit the setting information to the communication apparatus 151 using the short-range wireless communication unit 110 while the connection between the terminal apparatus 101 and the AP using the wireless LAN is maintained.

The present disclosure is also achieved by supplying a storage medium recording a program code of software for achieving the functions of the above exemplary embodiments to a system or an apparatus, and by a computer (or a CPU or a microprocessor unit (MPU)) of the system or the apparatus reading and executing the program code stored in the storage medium. In this case, the program code itself read from the storage medium achieves the functions of the above exemplary embodiments, and the storage medium storing the program code constitutes the present disclosure.

As the storage medium for supplying the program code, a flexible disk, a hard disk, an optical disc, a magneto-optical disc, a Compact Disc Read-Only Memory (CD-ROM), a Compact Disc-Recordable (CD-R), a magnetic tape, a non-volatile memory card, a ROM, or a Digital Versatile Disc (DVD) can be used.

Not only a case where the functions of the above exemplary embodiments are achieved by executing the program code read by the computer, but also a case where an OS operating on the computer performs a part or all of actual processing based on an instruction from the program code, and the functions of the above exemplary embodiments are achieved by the processing is included.

According to the present disclosure, it is possible to improve the convenience of a form in which an information processing apparatus transmits setting information to connect to a network to a communication apparatus.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-092939, filed Jun. 6, 2023, which is hereby incorporated by reference herein in its entirety.

What is claimed is:

1. A method for controlling an information processing apparatus, the control method comprising:

receiving a predetermined instruction;

in a case where the predetermined instruction is received and Internet Protocol version 4 (IPv4) is set as a protocol used for communication by the information processing apparatus, executing a first setting process without executing a display process, the first setting process being for transmitting, to a communication apparatus, setting information, the setting information including information for the communication apparatus to connect to one or more networks formed by one or more access points outside the information processing apparatus using a first connection method;

in a case where the predetermined instruction is received and Internet Protocol version 6 (IPv6) is set as a protocol used for communication by the information processing apparatus, executing the display process for displaying a selection screen that is a screen at least including an area for selecting a second connection method different from the first connection method as a connection method between the communication apparatus and the one or more networks; and executing, in a case where the area for selecting the second connection method is selected, a process regarding a second setting process for establishing a connection between the communication apparatus and the one or more networks using the second connection method.

2. The method according to claim 1, further comprising:

making a first determination of whether the IPV4 is set as the protocol used for communication by the information processing apparatus, wherein whether to execute the first setting process without executing the display process or execute the display process is controlled based on a result of the first determination.

3. The method according to claim 1, wherein in a case where the information processing apparatus is connected to a network when the predetermined instruction is received and the IPV4 is set as the protocol used for communication by the information processing apparatus, the first setting process is executed without executing the display process, and wherein in a case where the information processing apparatus is not connected to the network when the predetermined instruction is received, the display process is executed.

4. The method according to claim 1, wherein in a case where a wireless profile regarding a network to which the information processing apparatus is connected when the predetermined instruction is received is saved in advance in the information processing apparatus before the predetermined instruction is received and the IPV4 is set as the protocol used for communication by the information processing apparatus, the first setting process is executed without executing the display process, and wherein in a case where the wireless profile regarding the network to which the information processing apparatus is connected when the predetermined instruction is received is not saved in advance in the information processing apparatus before the predetermined instruction is received, the display process is executed.

5. The method according to claim 1, wherein in a case where; a wireless profile regarding a network to which the information processing apparatus is connected when the predetermined instruction is received is not saved in advance in the information processing apparatus before the predetermined instruction is received; the network to which the information processing apparatus is connected when the predetermined instruction is received is a network connectable without a password; and the IPV4 is set as the protocol used for communication by the information processing apparatus, the first setting process is executed without executing the display process, and wherein in a case where; the wireless profile regarding the network to which the information processing apparatus is connected when the predetermined instruction is received is not saved in advance in the information processing apparatus before the predetermined instruction is received; and the network to which the information processing apparatus is connected when the predetermined instruction is received is not a network connectable without a password, the display process is executed.

6. The method according to claim 5, further comprising:

making a first determination of whether the IPV4 is set as the protocol used for communication by the information processing apparatus;

making a second determination of whether the wireless profile regarding the network to which the information processing apparatus is connected when the predetermined instruction is received is saved in advance in the information processing apparatus before the predetermined instruction is received; and making a third determination of whether the network to which the information processing apparatus is connected when the predetermined instruction is received is a network connectable without a password, wherein whether to execute the first setting process without executing the display process or execute the display process is controlled based on a result of the first determination, a result of the second determination, and a result of the third determination.

7. The method according to claim 4, wherein the setting information transmitted in a case where the wireless profile regarding the network to which the information processing apparatus is connected when the predetermined instruction is received is saved in advance in the information processing apparatus before the predetermined instruction is received includes information included in the wireless profile regarding the network to which the information processing apparatus is connected when the predetermined instruction is received.

8. The method according to claim 1, wherein in a case where; the predetermined instruction is received; the IPv6 is set as the protocol used for communication by the information processing apparatus; and the communication apparatus supports the IPV6, the first setting process is executed without executing the display process, and wherein in a case where; the predetermined instruction is received; the IPv6 is set as the protocol used for communication by the information processing apparatus; and the communication apparatus does not support the IPv6, the display process is executed.

9. The method according to claim 8, further comprising:

making a first determination of whether the IPV4 is set as the protocol used for communication by the information processing apparatus; and making a second determination of whether the communication apparatus supports the IPv6 protocol, wherein whether to execute the first setting process without executing the display process or execute the display process is controlled based on a result of the first determination and a result of the second determination.

10. The method according to claim 1, wherein the selection screen further includes an area for selecting the first connection method as a connection method between the communication apparatus and the one or more networks, and wherein in a case where the area for selecting the first connection method is selected, the first setting process is executed.

11. The method according to claim 10, wherein in a case where the area for selecting the first connection method is selected and the IPV4 is set as the protocol used for communication by the information processing apparatus, the first setting process is executed, wherein in a case where; the area for selecting the first connection method is selected; the IPV6 is set as the protocol used for communication by the information processing apparatus; and the communication apparatus supports the IPV6 protocol, the first setting process is executed, and wherein in a case where: the area for selecting the first connection method is selected; the IPv6 is set as the protocol used for communication by the information processing apparatus; and the communication apparatus does not support the IPV6, the first setting process is not executed.

12. The method according to claim 1, wherein the first connection method is a wireless local area network (LAN), wherein the second connection method is a wired LAN, and wherein a connection between the communication apparatus and the one or more networks established by the first setting process is a connection using the wireless LAN.

13. The method according to claim 1, wherein the selection screen further includes an area for selecting a third connection method as a connection method between the communication apparatus and the one or more networks, wherein the third connection method is a connection method using Universal Serial Bus (USB), and wherein in a case where the area for selecting the third connection method is selected, a process for displaying an operation method for connecting the communication apparatus and the information processing apparatus using the USB is executed.

14. The method according to claim 1, wherein the first setting process is a process for transmitting the setting information to the communication apparatus using a communication method based on the Institute of Electrical and Electronics Engineers (IEEE) 802.11 series standard.

15. The method according to claim 1, wherein the second setting process is a process for connecting the communication apparatus and the one or more networks by wire and is a process executed by a user connecting the communication apparatus and an access point corresponding to the one or more networks by wire.

16. The method according to claim 1, further comprising:

transmitting, to the communication apparatus, at least one of a print job for causing the communication apparatus to execute printing and a scan job for causing the communication apparatus to execute scanning.

17. A non-transitory computer-readable storage medium storing a program for causing a computer to execute a control method for controlling an information processing apparatus, the control method comprising:

receiving a predetermined instruction;

in a case where the predetermined instruction is received and Internet Protocol version 4 (IPv4) is set as a protocol used for communication by the information processing apparatus, executing a first setting process without executing a display process, the first setting process being for transmitting, to a communication apparatus, setting information, the setting information including information for the communication apparatus to connect to one or more networks formed by one or more access points outside the information processing apparatus using a first connection method;

in a case where the predetermined instruction is received and Internet Protocol version 6 (IPv6) is set as a protocol used for communication by the information processing apparatus, executing the display process for displaying a selection screen that is a screen at least including an area for selecting a second connection method different from the first connection method as a connection method between the communication apparatus and the one or more networks; and executing, in a case where the area for selecting the second connection method is selected, a process regarding a second setting process for establishing a connection between the communication apparatus and the one or more networks using the second connection method.

18. An information processing apparatus comprising:

a receiver configured to receive a predetermined instruction; and one or more processors and one or more memories coupled to the one or more processors to:

in a case where the predetermined instruction is received and Internet Protocol version 4 (IPv4) is set as a protocol used for communication by the information processing apparatus, execute a first setting process without executing a display process, the first setting process being for transmitting, to a communication apparatus, setting information, the setting information including information for the communication apparatus to connect to one or more networks formed by one or more access points outside the information processing apparatus using a first connection method, in a case where the predetermined instruction is received and Internet Protocol version 6 (IPv6) is set as a protocol used for communication by the information processing apparatus, execute the display process for displaying a selection screen that is a screen at least including an area for selecting a second connection method different from the first connection method as a connection method between the communication apparatus and the one or more networks, and in a case where the area for selecting the second connection method is selected, execute a process regarding a second setting process for establishing a connection between the communication apparatus and the one or more networks using the second connection method.

* * * * *